United States Patent
Hitaka

(10) Patent No.: US 11,468,279 B2
(45) Date of Patent: Oct. 11, 2022

(54) IMAGE FORMING DEVICE AND IMAGE FORMING DEVICE DIAGNOSTIC SYSTEM

(71) Applicant: Konica Minolta, Inc., Tokyo (JP)

(72) Inventor: Masatoshi Hitaka, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/023,803

(22) Filed: Sep. 17, 2020

(65) Prior Publication Data

US 2021/0081733 A1  Mar. 18, 2021

(30) Foreign Application Priority Data

Sep. 17, 2019 (JP) .............................. JP2019-168559

(51) Int. Cl.
| | |
|---|---|
| G06K 15/00 | (2006.01) |
| G03G 15/00 | (2006.01) |
| G06K 15/14 | (2006.01) |
| G06K 15/16 | (2006.01) |

(52) U.S. Cl.
CPC ........... G06K 15/408 (2013.01); G03G 15/55 (2013.01); G06K 15/14 (2013.01); G06K 15/16 (2013.01); G06K 15/402 (2013.01)

(58) Field of Classification Search
None
See application file for complete search history.

(56) References Cited

U.S. PATENT DOCUMENTS

| | | |
|---|---|---|
| 4,937,622 A | 6/1990 | Makiura |
| 5,138,376 A | 8/1992 | Maruta et al. |
| 5,805,932 A | 9/1998 | Kawashima et al. |
| (Continued) | | |

FOREIGN PATENT DOCUMENTS

| | | |
|---|---|---|
| JP | S60-159868 A | 8/1985 |
| JP | 2006-30258 A | 2/2006 |
| (Continued) | | |

OTHER PUBLICATIONS

Office Action issued in corresponding U.S. Appl. No. 17/010,718 dated Jul. 8, 2021 (36 pages).

(Continued)

*Primary Examiner* — Dung D Tran
(74) *Attorney, Agent, or Firm* — Osha Bergman Watanabe & Burton LLP

(57) ABSTRACT

An image forming device includes: an image former that executes image forming processing to form an image on a sheet; a primary controller; a secondary controller that controls the image former; a sensor that detects a state of the image former and transmits sensor data indicating the state to the secondary controller; a first transmission path between the secondary controller and the primary controller; and a second transmission path different from the first transmission path. The primary controller instructs the secondary controller to execute the image forming processing. Data related to the execution of the image forming processing is transmitted through the first transmission path. The secondary controller generates diagnostic data for failure diagnostics from the sensor data and life prediction relating to the image forming device and transmits the diagnostic data to the primary controller via the second transmission path.

17 Claims, 25 Drawing Sheets

(56) References Cited

U.S. PATENT DOCUMENTS

| | | | |
|---|---|---|---|
| 10,257,382 B2* | 4/2019 | Yasunaga | H04N 1/33361 |
| 2003/0138257 A1 | 7/2003 | DiRubio et al. | |
| 2005/0027486 A1 | 2/2005 | Kitada et al. | |
| 2005/0030562 A1* | 2/2005 | Hama | G03G 15/5058 |
| | | | 358/1.9 |
| 2005/0254864 A1* | 11/2005 | Koide | G03G 15/0194 |
| | | | 399/299 |
| 2007/0174601 A1* | 7/2007 | Douglas | G06F 8/65 |
| | | | 713/1 |
| 2008/0075476 A1 | 3/2008 | Nakazato et al. | |
| 2008/0199193 A1 | 8/2008 | Nakazato et al. | |
| 2009/0316173 A1* | 12/2009 | Tanaka | H04N 1/603 |
| | | | 358/1.9 |
| 2010/0058123 A1 | 3/2010 | Yamashirodani et al. | |
| 2010/0088541 A1 | 4/2010 | Tanaka et al. | |
| 2011/0231712 A1 | 9/2011 | Hirata | |
| 2012/0069398 A1* | 3/2012 | Nemoto | G06K 15/1821 |
| | | | 358/1.15 |
| 2012/0331279 A1 | 12/2012 | Matsubara | |
| 2014/0078552 A1* | 3/2014 | Wang | G06K 15/00 |
| | | | 358/1.15 |
| 2014/0153938 A1 | 6/2014 | Saito | |
| 2014/0307278 A1* | 10/2014 | Kinoda | G06K 15/16 |
| | | | 358/1.12 |
| 2014/0358487 A1 | 12/2014 | Shin | |
| 2015/0150096 A1 | 5/2015 | Yamaguchi | |
| 2016/0352935 A1 | 12/2016 | Hirama | |
| 2017/0212001 A1 | 7/2017 | Kamezaki | |
| 2018/0173148 A1* | 6/2018 | Etou | G03G 15/553 |
| 2019/0056899 A1* | 2/2019 | Fukuoka | G06F 3/1236 |
| 2022/0116503 A1* | 4/2022 | Hitaka | H04N 1/00323 |

FOREIGN PATENT DOCUMENTS

| | | | |
|---|---|---|---|
| JP | 2008-009854 A | | 1/2008 |
| JP | 2015-94919 A | | 5/2015 |
| JP | 2017-216654 A | | 12/2017 |
| JP | 2017216654 A | * | 12/2017 |
| JP | 2018-92593 A | | 6/2018 |

OTHER PUBLICATIONS

Y. Xu, Y. Peng, and S. Liu, "Application of NB-IoT Technology in Internet of Things Label Printer," 2018 Chinese Automation Congress (CAC), 2018, pp. 1223-1228, doi: 10.1109/CAC.2018.8623108. (Year: 2018) (6 pages).

* cited by examiner

FIG. 8

| Image forming device #1 | |
|---|---|
| Time received | Sheet arrival time (ms) |
| 2018/5/10/10:00:00 | 250 |
| 2018/5/10/10:00:01 | 251 |
| 2018/5/10/10:00:02 | 250 |
| 2018/5/10/10:00:03 | 270 | ⇐ Reception of unexpectedly late sensor data
| 2018/5/10/10:00:06 | 250 |
| ... | ... |
| 2018/12/01/15:00:10 | 260 |
| Image forming device #2 | |
| Time received | Sheet arrival time (ms) |
| 2018/5/12/11:00:10 | 250 |
| 2018/5/12/11:05:01 | 248 |
| 2018/5/15/09:00:12 | 252 |
| 2018/5/15/09:01:12 | 252 |
| 2018/5/15/09:01:20 | 252 |
| ... | ... |
| 2018/5/20/09:00:00 | 251 |
| Image forming device #3 | |
| Time received | Sheet arrival time (ms) |
| ... | ... |

FIG. 12

| Executing print job | Executing scan job | Judgment result |
|---|---|---|
| No | No | Normal |
| Yes | No | Normal |
| No | Yes | Normal |
| Yes | Yes | High load |

FIG. 15A

Example of sheet arrival times T and average value

| Sheet count | Sheet arrival time (ms) |
|---|---|
| 1 | 262 |
| 2 | 262 |
| 3 | 260 |
| Average value | 261.3 |

 Transmitted data

FIG. 15B

Example of accumulated data of diagnostic server 101

| Image forming device #1 ||
|---|---|
| Time received | Sheet arrival time (ms) |
| 2018/5/10/10:00:02 | 250.0 |
| 2018/5/10/10:00:21 | 251.1 |
| 2018/5/10/10:00:52 | 250.3 |
| ... | ... |
| 2018/12/01/15:00:10 | 261.3 |

 Most recently received data

| Image forming device #2 ||
|---|---|
| Time received | Sheet arrival time (ms) |
| 2018/5/12/11:00:10 | 250.1 |
| 2018/5/12/11:05:01 | 248.0 |
| 2018/5/15/09:00:12 | 252.0 |
| ... | ... |
| 2018/5/20/09:00:00 | 251 |

| Image forming device #3 ||
|---|---|
| Time received | Sheet arrival time (ms) |
| ... | ... |

FIG. 16A

When sheet slippage occurs

| Sheet count | Sheet arrival time (ms) |
|---|---|
| 1 | 262 |
| 2 | 262 |
| 3 | 280 |
| Average value | 268.0 |

⇐ Data indicating occurrence of sheet slippage

FIG. 16B

When sheet slippage does not occur

| Sheet count | Sheet arrival time (ms) |
|---|---|
| 1 | 262 |
| 2 | 262 |
| 3 | 260 |
| Average value | 261.3 |

FIG. 18A

Example of sheet arrival times T and average values

| Sheet count | Sheet arrival time (ms) | Average value (ms) |
|---|---|---|
| 1 | 260 | |
| 2 | 262 | 261.0 |
| 3 | 261 | |
| 1 | 262 | |
| 2 | 262 | 261.3 |
| 3 | 260 | |

FIG. 18B

Example of diagnostic data

| Diagnostic data format | Diagnostic data |
|---|---|
| Average value | 261.0 |
| Average value | 261.3 |

FIG. 18C

Example of accumulated data of diagnostic server 101

| Image forming device #1 | |
|---|---|
| Time received | Sheet arrival time (ms) |
| 2018/5/10/10:00:02 | 250.0 |
| 2018/5/10/10:00:21 | 251.1 |
| 2018/5/10/10:00:52 | 250.3 |
| ... | ... |
| 2018/12/01/15:00:10 | 261.3 |
| Image forming device #2 | |
| Time received | Sheet arrival time (ms) |
| ... | ... |

← Most recently received data

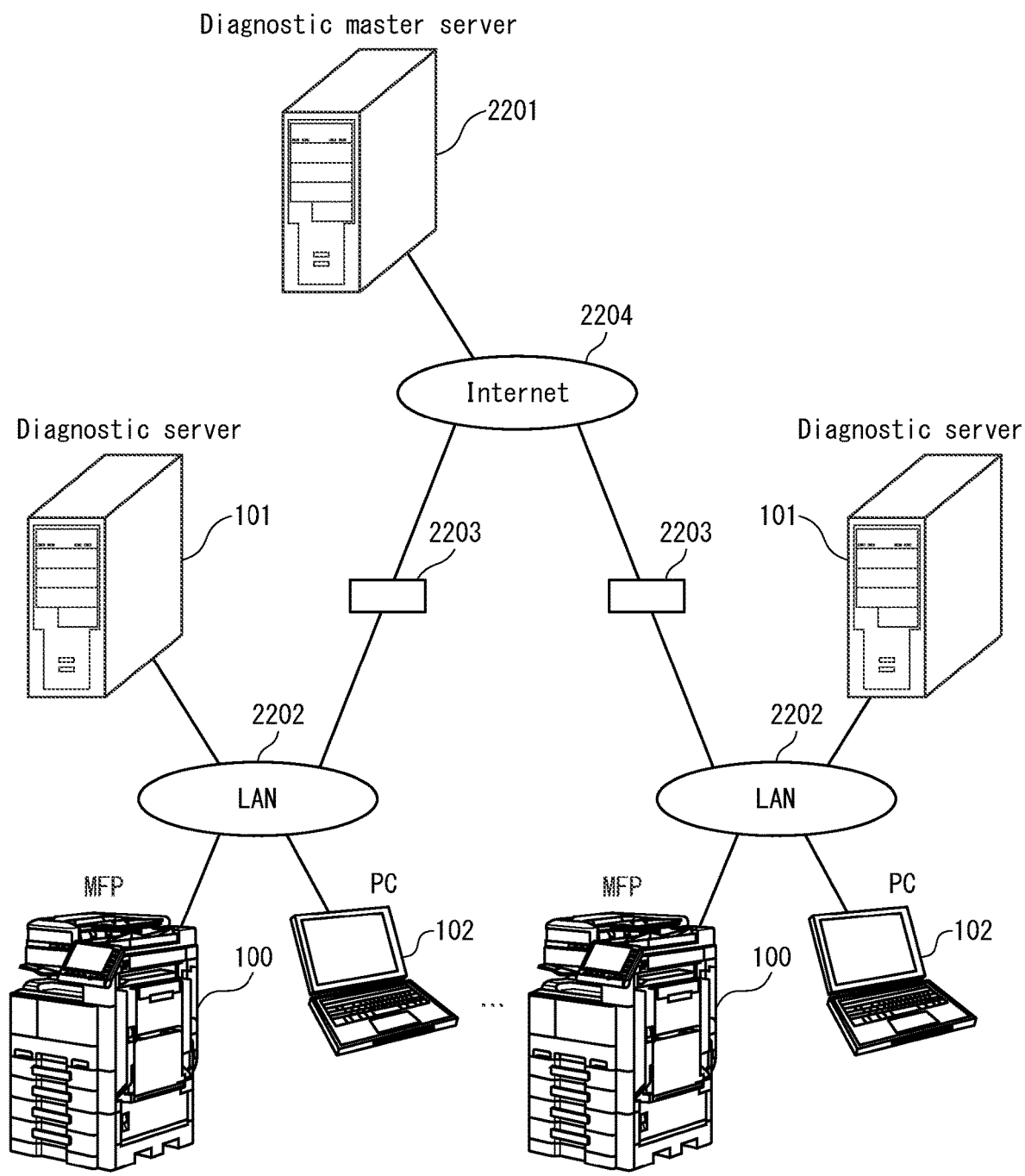

FIG. 21A

Example of sheet arrival times T and average values

| Sheet count | Sheet arrival time (ms) | ID |
|---|---|---|
| 1 | 262 | 1 |
| 2 | 262 | 1 |
| ... | ... | ... |
| 100 | 260 | 1 |
| Average value | 261.3 | 1 |
| 1 | 262 | 2 |
| 2 | 262 | 2 |
| ... | ... | ... |
| 100 | 260 | 2 |
| Average value | 261.3 | 2 |

FIG. 21B

Example diagnostic data transmitted to diagnostic server 101

| Sheet arrival time (ms) | ID | Sheet count |
|---|---|---|
| 260 | 2 | 100 |

FIG. 21C

Example diagnostic data transmitted to diagnostic master server 2201

| Average value (ms) | ID |
|---|---|
| 261.3 | 2 |

FIG. 21D

Example of accumulated data of diagnostic server 101

| Image forming device #1 | | |
|---|---|---|
| Time received | Sheet arrival time (ms) | ID |
| 2018/5/10/10:00:02 | 250 | 1 |
| 2018/5/10/10:00:21 | 251 | 1 |
| 2018/5/10/10:00:52 | 250 | 1 |
| ... | ... | ... |
| 2018/12/01/15:00:09 | 261 | 2 |
| 2018/12/01/15:00:10 | 260 | 2 |

FIG. 22A

Example of data transmitted from diagnostic server 101 to diagnostic master server 2201

| Diagnostic results (remaining days) | ID | Sheet count | Device IP address |
|---|---|---|---|
| 105 | 2 | 100 | IP_a.b.c.d |

FIG. 22B

Example of accumulated data of diagnostic master server 2201

| Time received | Received from diagnostic server | | | | Received from image forming device (IP_a.b.c.d) | |
|---|---|---|---|---|---|---|
| | Remaining days until end of life | ID | Sheet count | Device IP address | Sheet arrival time (ms) | ID |
| 2018/5/08/10:00:02 | | | | | 250.1 | 1 |
| 2018/5/09/10:00:00 | 1130 | 1 | 27 | IP_a.b.c.d | | |
| 2018/5/10/10:00:02 | | | | | 250.1 | 2 |
| 2018/5/11/12:00:21 | | | | | 251.0 | 3 |
| 2018/5/13/10:00:52 | | | | | 250.0 | 4 |
| 2018/5/15/10:00:52 | | | | | 250.2 | 5 |
| 2018/5/16/10:00:00 | 1128 | 5 | 98 | IP_a.b.c.d | | |
| ... | ... | ... | ... | ... | ... | ... |
| 2018/12/04/15:00:10 | | | | | 261.3 | 2 |
| 2018/12/05/00:00:00 | 900 | 2 | 60 | IP_a.b.c.d | | |

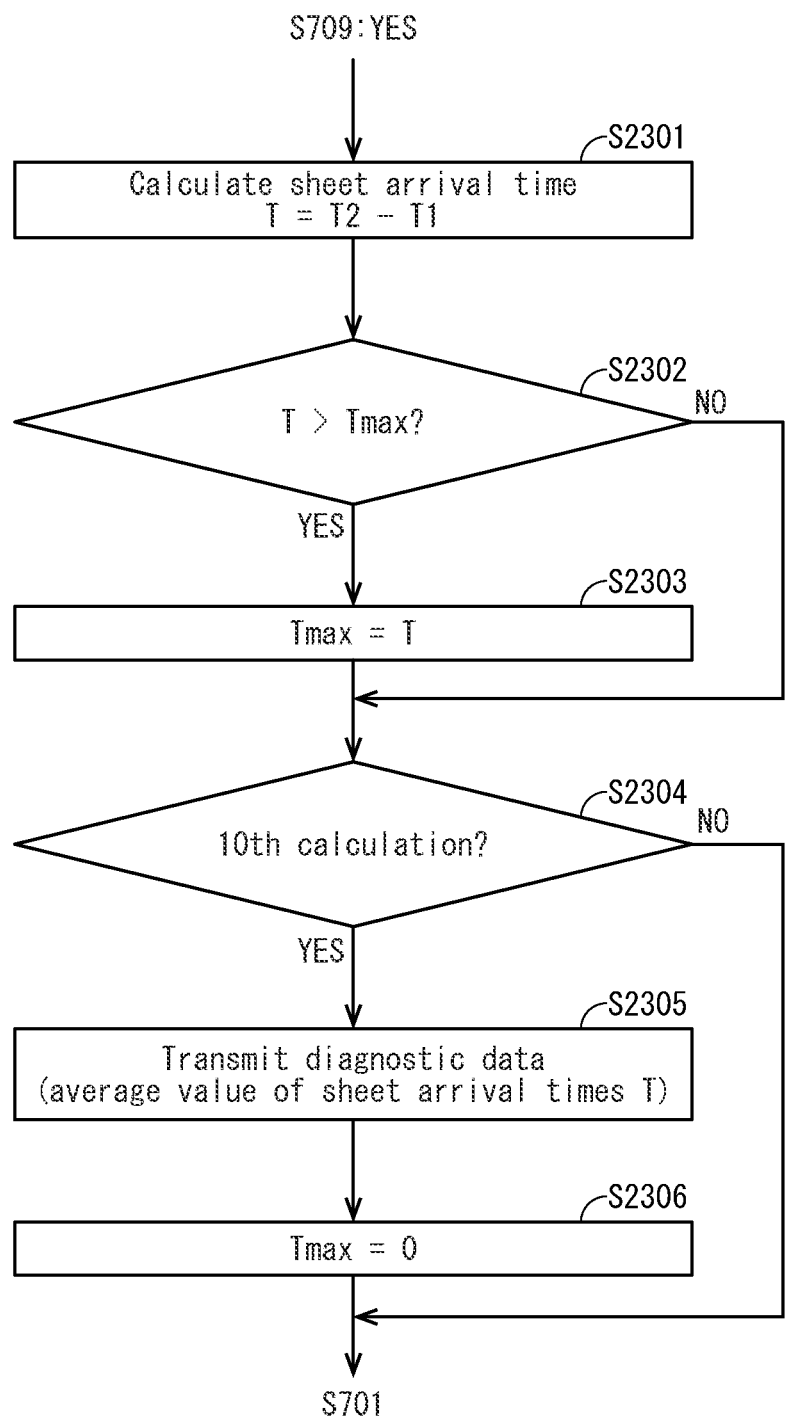

FIG. 24A

Example of sheet arrival times T and maximum value

| Sheet count | Sheet arrival time (ms) |
|---|---|
| 1 | 262 |
| 2 | 262 |
| 3 | 260 |
| ... | ... |
| 8 | 260 |
| 9 | 261 |
| 10 | 261 |
| Maximum value | 262 |

FIG. 24B

Example of diagnostic data transmitted to diagnostic server 101

| Sheet arrival time (ms) | Format(0: each sheet, 1: maximum value for 10 sheets) |
|---|---|
| 262 | 1 |

FIG. 24C

Example of accumulated data of diagnostic server 101

| Image forming device #1 | | |
|---|---|---|
| Time received | Sheet arrival time (ms) | Format |
| 2018/5/10/10:00:02 | 250 | 1 |
| 2018/5/10/10:00:21 | 251 | 1 |
| 2018/5/10/10:00:52 | 250 | 1 |
| ... | ... | ... |
| 2018/12/01/15:00:10 | 262 | 1 |
| Image forming device #2 | | |
| ... | ... | ... |

FIG. 25A

Example of sheet arrival times T and minimum value

| Sheet count | Sheet arrival time (ms) |
|---|---|
| 1 | 262 |
| 2 | 262 |
| 3 | 260 |
| ... | ... |
| 8 | 260 |
| 9 | 261 |
| 10 | 261 |
| Minimum value | 260 |

FIG. 25B

Example of diagnostic data transmitted to diagnostic server 101

| Sheet arrival time (ms) | Format(0: each sheet, 1: maximum value for 10 sheets) |
|---|---|
| 260 | 1 |

FIG. 25C

Example of accumulated data of diagnostic server 101

| Image forming device #1 | | |
|---|---|---|
| Time received | Sheet arrival time (ms) | Format |
| 2018/5/10/10:00:02 | 250 | 1 |
| 2018/5/10/10:00:21 | 251 | 1 |
| 2018/5/10/10:00:52 | 250 | 1 |
| ... | ... | ... |
| 2018/12/01/15:00:10 | 260 | 1 |
| Image forming device #2 | | |
| ... | ... | ... |

IMAGE FORMING DEVICE AND IMAGE FORMING DEVICE DIAGNOSTIC SYSTEM

CROSS-REFERENCE TO RELATED APPLICATIONS

This application claims priority to Japanese patent Application No. 2019-168559, filed on Sep. 17, 2019, the contents of which are incorporated herein by reference in its entirety.

BACKGROUND

(1) Technical Field

The present disclosure relates to image forming devices and image forming device diagnostic systems, and in particular to techniques for increasing diagnostic data acquisition frequency in order to improve image forming device diagnostic accuracy.

(2) Description of Related Art

Conventionally, a system exists that remotely executes failure diagnostics and life prediction with respect to an image forming device by using a diagnostic server. The image forming device includes a mechanism controller (secondary controller) that controls mechanisms for executing image forming processing and a primary controller that receives a job from a user then causes the mechanism controller to execute the control of mechanisms. The mechanism controller references output from various sensors and the primary controller sends acquired sensor data to a diagnostic server. The image forming device and the diagnostic server use the sensor data to perform failure diagnostics and life prediction.

A communication path for transmitting the sensor data from the mechanism controller to the primary controller is also used for transmitting operation instructions, modes, and the like from the primary controller to the mechanism controller. In recent years, there is a demand for such applications to have real-time properties, and therefore delay of operation instructions, modes, and the like from the primary controller to the mechanism controller cannot be allowed. However, if an amount of transmitted sensor data is too large, there is a risk of delay in communication of operation instructions, modes, and the like.

For example, if 200 bytes of data are transmitted and received between the primary controller and the mechanism controller each time an image is formed, and a user of the image forming device prints 1,000 sheets per day, 200 kilobytes of data are transmitted and received per day. If 3,000 sheets are printed per day, an amount of transmitted and received data is tripled to 600 kilobytes per day.

Further, such data is not transmitted and received evenly over 24 hours, but is often transmitted and received during a specific period of time, and a communication load between the primary controller and the mechanism controller is high during such a period of time.

Thus, if sensor data is frequently transmitted also using the communication path for transmitting and receiving image forming data, depending on the time period, communication for image forming processing might be delayed, leading to the image forming processing being delayed, and even to a decrease in image quality.

In response, for example, an average value, maximum value, and minimum value of sensor data can be obtained by the mechanism controller and only the average value or the like is transmitted to the primary controller, thereby suppressing an amount of transmitted sensor data. Accordingly, communication for other purposes can be smoothly executed without delay.

However, when a number of sensor data samples used to obtain an average value is increased, a sample value used when an unexpected change occurs may be buried in normal sample values and therefore difficult to recognize. Further, maximum and minimum values are obtained for each time period of some length, and therefore although it is possible to send data values to the diagnostic server when an unexpected change in sensor data occurs, sufficient information is not conveyed for when the unexpected change occurred or how many times unexpected changes occurred. Thus, when average values or the like are used, there is inevitably a limit to improvement of accuracy of failure diagnostics and life prediction.

However, if all sensor data is transmitted from the mechanism controller to the primary controller, there is a risk of impeding communication for other purposes such as operation instructions and mode changes when image forming.

SUMMARY

One or more embodiments of the present invention provide an image forming device and an image forming device diagnostic system that can improve the accuracy of failure diagnostics and life prediction without impeding other processing in the image forming device.

An image forming device according to one or more embodiments is an image forming device including an image former, a primary controller, a secondary controller, one or more sensors, a first transmission path, and a second transmission path. The image former executes image forming processing to form an image on a sheet. The primary controller instructs the secondary controller to cause execution of the image forming processing. The secondary controller controls mechanical systems of the image former. Each sensor of the one or more sensors detects a state of the image former and transmits sensor data indicating the state to the secondary controller. The first transmission path between the secondary controller and the primary controller is for transmission of data related to the execution of the image forming processing. The second transmission path is different from the first transmission path. The secondary controller includes a generation unit that generates diagnostic data from the sensor data for failure diagnostics and life prediction relating to the image forming device, and a transmitter that transmits the diagnostic data to the primary controller via the second transmission path.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings:

FIG. 8 is a table illustrating reception day and time and value of sheet arrival time T;

FIG. 12 is a table illustrating jobs being executed by an image forming device and results of determination of load states of the primary controller 201;

FIG. 15A is a table illustrating sheet arrival times T and average values, and FIG. 15B is a table illustrating accumulated data of a diagnostic server 101;

FIG. 16A is a table illustrating sheet count, sheet arrival time T, and average value when a sheet slips, and FIG. 16B is a table illustrating sheet count, sheet arrival time T, and average value when a sheet slip does not occur;

FIG. 18A is a table illustrating sheet arrival times T and average values, and FIG. 18B is a table illustrating diagnostic data, and FIG. 18C is a table illustrating accumulated data of the diagnostic server 101;

FIG. 19 is a diagram illustrating an image forming device diagnostic system 1 according to Embodiment 5 of the present invention;

FIG. 21A is a table illustrating sheet arrival times T and average values, FIG. 21B is a table illustrating the sheet arrival time T, which is diagnostic data transmitted to the diagnostic server, FIG. 21C is a table illustrating an average value, which is diagnostic data transmitted to the diagnostic server, and FIG. 21D is a table illustrating accumulated data of the diagnostic server 101;

FIG. 22A is a table illustrating data transmitted from the diagnostic server 101 to a diagnostic parent server 2201, and FIG. 22B is a table illustrating accumulated data of the diagnostic parent server;

FIG. 23 is a flowchart for describing operations of the mechanism controller 200 pertaining to Embodiment 10;

FIG. 24A is a table illustrating sheet arrival times T and a maximum value, and FIG. 24B is a table illustrating a maximum value, which is diagnostic data transmitted to the diagnostic server 101, and FIG. 24C is a table illustrating accumulated data of the diagnostic server 101;

FIG. 25A is a table illustrating sheet arrival times T and a minimum value, and FIG. 25B is a table illustrating a minimum value, which is diagnostic data transmitted to the diagnostic server 101, and FIG. 25C is a table illustrating accumulated data of the diagnostic server 101.

DETAILED DESCRIPTION

Hereinafter, embodiments of the present invention will be described with reference to the drawings. However, the scope of the invention is not limited to the disclosed embodiments.

The following describes embodiments of an image forming device and an image forming device diagnostic system with reference to the drawings.

[1] EMBODIMENT 1

The following is a description of an image forming device diagnostic system pertaining to Embodiment 1.

(1-1) Structure of Image Forming Device Diagnostic System

Structure of the image forming device diagnostic system is described below.

Figure 1:
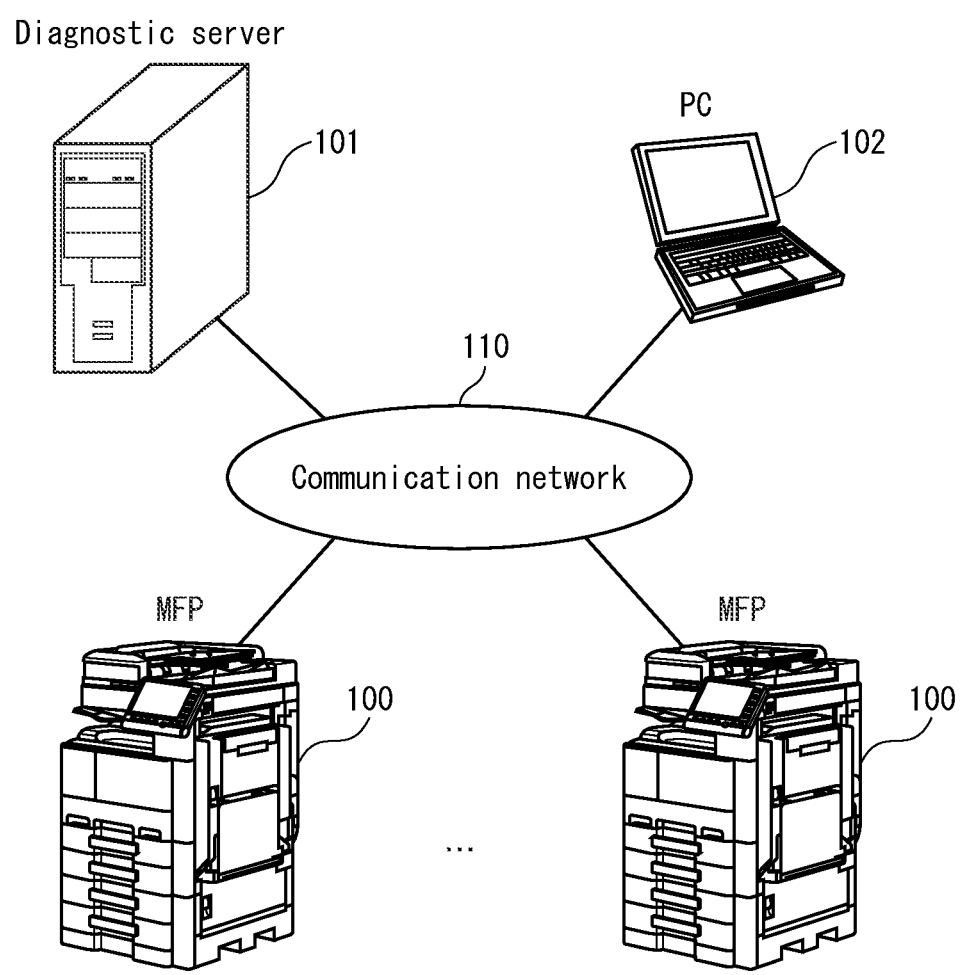
FIG. 1 is a diagram illustrating an image forming device diagnostic system according to Embodiment 1 of the present invention.

As illustrated in FIG. 1, the image forming device diagnostic system 1 includes a plurality of the image forming device 100, a diagnostic server and image forming device management server (also referred to as "diagnostic server") 101, and a personal computer (PC) 102 connected via a communication network 110. The communication network 110 may be a local area network (LAN), and may be a combination of LAN and the internet.

The image forming device 100 is a tandem-type color multi-function peripheral (MFP), and is provided with various sensors, and detection values of these sensors (sensor data) are transmitted to the diagnostic server 101 via the communication network 110. The diagnostic server 101 accumulates received sensor data to perform failure diagnostics for identifying failure locations and life prediction for components of the image forming device 100. If sensor data is analyzed and analysis results are fed back to an algorithm for failure diagnostics and life prediction, diagnostic control and prediction accuracy can be improved. The analysis may be automatically performed by the diagnostic server 101, and may be performed by a person.

The PC 102 transmits a print job to the image forming device 100 to cause execution of image forming processing.

(1-2) Structure of Image Forming Device 100

Structure of the image forming device 100 is described below.

Figure 2:
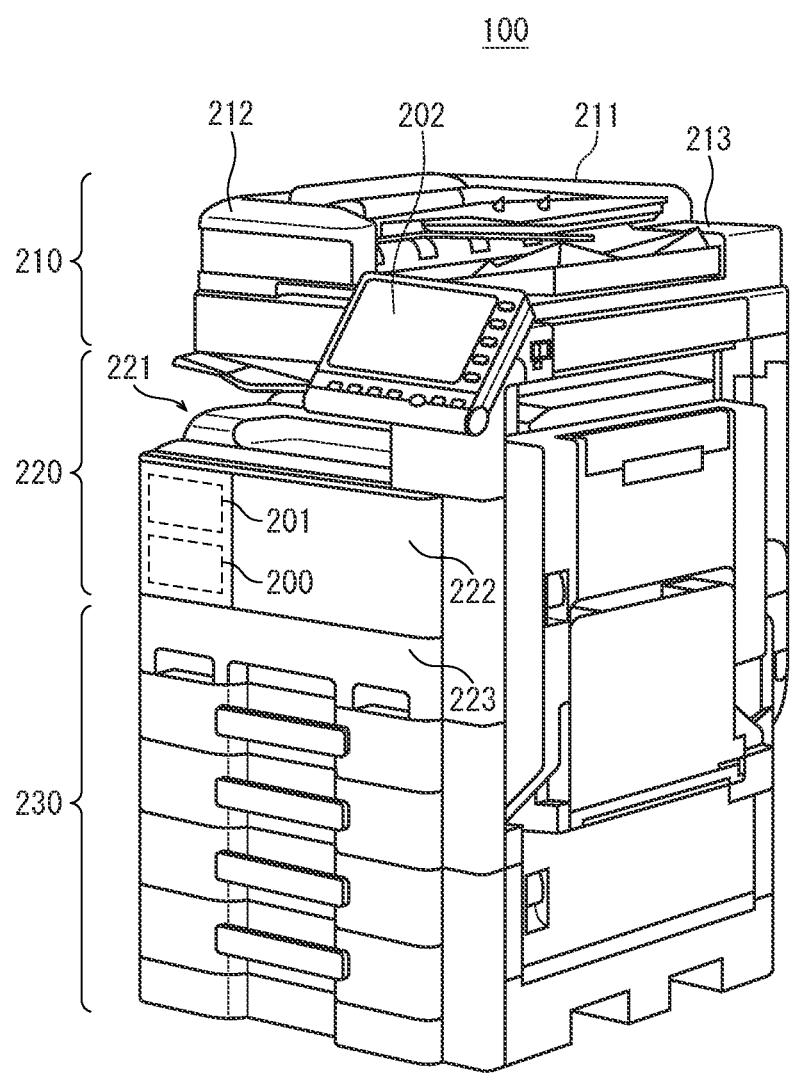
FIG. 2 is an external perspective view diagram of an image forming device 100.

As illustrated in FIG. 2, the image forming device 100 includes an image reader 210, a main body 220, and a sheet feeder 230. Further, the mechanism controller (i.e., secondary controller) 200 and the primary controller 201 are included. A combination of the main body 220 and the sheet feeder 230 is referred to as an image former. When reading a document by a sheet-through scheme, the image reader 210 uses the ADF 212 to read documents one by one from a document stack on the document tray 211, in order to generate image data. A read document is discharged onto a discharge tray 213

The primary controller 201 receives a print job from the PC 102 via the communication network 110, and instructs the mechanism controller 200 to execute the print job. The primary controller 201 can use image data generated by the image reader 210 to instruct the mechanism controller 200 to cause the sheet feeder 230 to feed a sheet and the main body 220 to execute image forming processing. Further, the primary controller 201 receives diagnostic data from the mechanism controller 200 (detection values from various sensors provided to the main body 220 and the sheet feeder 230 and/or processed data based on the detection values) and sends it to the diagnostic server 101.

Upon receiving an instruction from the primary controller 201, the mechanism controller 200 controls the main body 220 and the sheet feeder 230 to execute image forming processing. The mechanism controller 200 further acquires sensor data and transmits the sensor data to the primary controller 201. Sensor data is transmitted to the primary controller 201 via a transmission path different from that of instructions from the primary controller 201.

According to Embodiment 1, the main body 220 is described as a tandem-type color printer, but the main body 220 may be a color printer of another type or a monochrome printer.

When the main body 220 executes image forming processing, the sheet feeder 230 feeds a sheet designated by a user of the image forming device 100 through a print job or an operation panel 202. According to Embodiment 1, the sheet feeder 230 includes two sheet feed trays containing stacks of sheets, but the sheet feeder 230 may include one sheet feed tray, or three or more.

The main body 220 is provided with a toner cartridge door cover 222 and a front cover 223. When the toner cartridge door cover 222 is open, YMCK color toner cartridges can be installed and removed. When the front cover 223 is open, a power switch can be accessed. The toner cartridge door cover 222 and the front cover 223 are each provided with a sensor that detects the open/closed state of the cover.

(1-3) Structure of Controller 201

The following describes structure of the primary controller 201.

Figure 4:
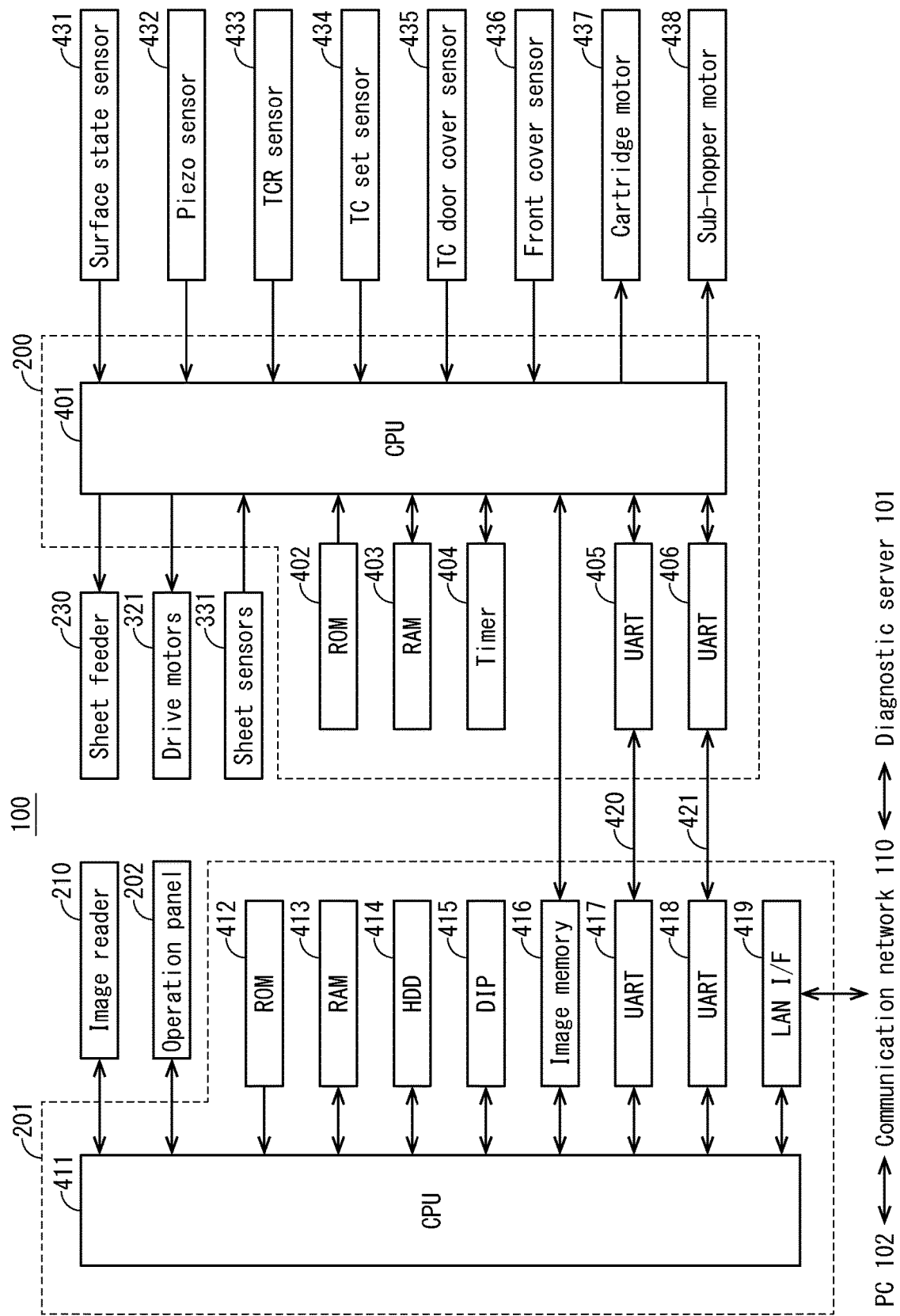
FIG. 4 is a block diagram illustrating structure of a mechanism controller 200 and a controller 201.

As illustrated in FIG. 4, the primary controller 201 includes a central processing unit (CPU) 411, read only memory (ROM) 412, random access memory (RAM) 413, and the like. When the CPU 411 is reset, a boot program is read from the ROM 413 and booted, and an operating system (OS) and application program are read from a hard disk drive (HDD) 414 and executed, using the RAM 413 as a working memory.

The primary controller 201 also includes a LAN interface 419, an image memory 416, a digital image processing (DIP) unit 415, and universal asynchronous receiver/transmitters (UART) 417, 418.

The LAN interface 419 executes processing for the primary controller 201 to communicate with the diagnostic server 101, the PC 102, and other devices via the communication network 110. The image memory 416 is a storage that stores image data generated by the image reader 210 and image data received from a device such as the PC 102. The mechanism controller 200 can read image data stored in the image memory 416. The DIP unit 415 executes image processing with respect to image data stored in the image memory 416. The image processing includes, for example, rasterization that converts image data in a format other than a bitmap format into a bitmap format.

The UART 417 converts a parallel digital signal into a serial signal and transmits the serial signal via a serial transmission path 420. For example, the UART 417 instructs the mechanism controller 200 to execute image forming processing by converting a command pertaining to execution of image forming processing received from the CPU 411 into a serial signal and transmitting the serial signal via the serial transmission path 420. Further, the UART 417 converts a serial signal received via the serial transmission path 420 into a parallel digital signal. For example, information regarding a paper jam or door opening and closing is acquired from the mechanism controller 200 by receiving and converting a serial signal of information regarding a paper jam or door opening and closing via the serial transmission path 420.

The UART 418 converts a serial signal received via a serial transmission path 421 into a parallel digital signal. For example, diagnostic data is acquired from the mechanism controller 200 by converting a serial signal of diagnostic data received via the serial transmission path 421. Further, the UART 418 converts a parallel digital signal into a serial signal and transmits the serial signal via the serial transmission path 421. For example, the UART 418 converts a command instructing suspension or a restart of transmission of diagnostic data received from the CPU 411 into a serial signal and transmits the serial signal via the serial transmission path 421, thereby instructing the mechanism controller 200 to suspend or restart transmission of diagnostic data.

The primary controller 201 executes an application program, thereby making the primary controller 201 receive a print job from the PC 102, store print data pertaining to the print job in the image memory 416, and cause the DIP unit 415 to execute image processing on the print data, or causing the DIP unit 415 to execute image processing on image data generated by the image reader 210.

Further, the primary controller 201 controls the operation panel 202 to present information to a user of the image forming device 100 and to accept operation input from the user.

(1-4) Structure of Mechanism Controller 200

Structure of the mechanism controller 200 is described below.

As illustrated in FIG. 4, the mechanism controller 200 includes a CPU 401, ROM 402, RAM 403, a timer 404, and the like. When the CPU 401 is reset, a boot program is read and booted from the ROM 402, and a control program read from the ROM 402 is executed while using the RAM 403 as a working memory. The CPU 401 acquires a current time by referring to a timer 404. Further, as described above, image data can be read from the image memory 416 of the primary controller 201.

The mechanism controller 200 also includes a UART 405, 406.

The UART 405 converts a serial signal received via the serial transmission path 420 into a parallel digital signal. Further, the UART 405 converts a parallel digital signal into a serial signal and transmits the serial signal via the serial transmission path 420.

The UART 406 converts a parallel digital signal into a serial signal and transmits the serial signal via the serial transmission path 421. Further, the UART 406 converts a serial signal received via the serial transmission path 421 into a parallel digital signal.

(1-5) Operations of Controller 201

An image forming device according to Embodiment 1 temporarily stops transmission of diagnostic data to a diagnostic server when a processing load of a controller is high and transmits diagnostic data to the diagnostic server when the processor load of the primary controller is normal.

In parallel with processing similar to that of a conventional image forming device, such as initial setting processing when powered on, job reception processing, and executing instructions of received jobs, the primary controller 201 monitors a processing load of the primary controller 201 and suspends transmission of diagnostic data when the processing load is high.

Figure 11:
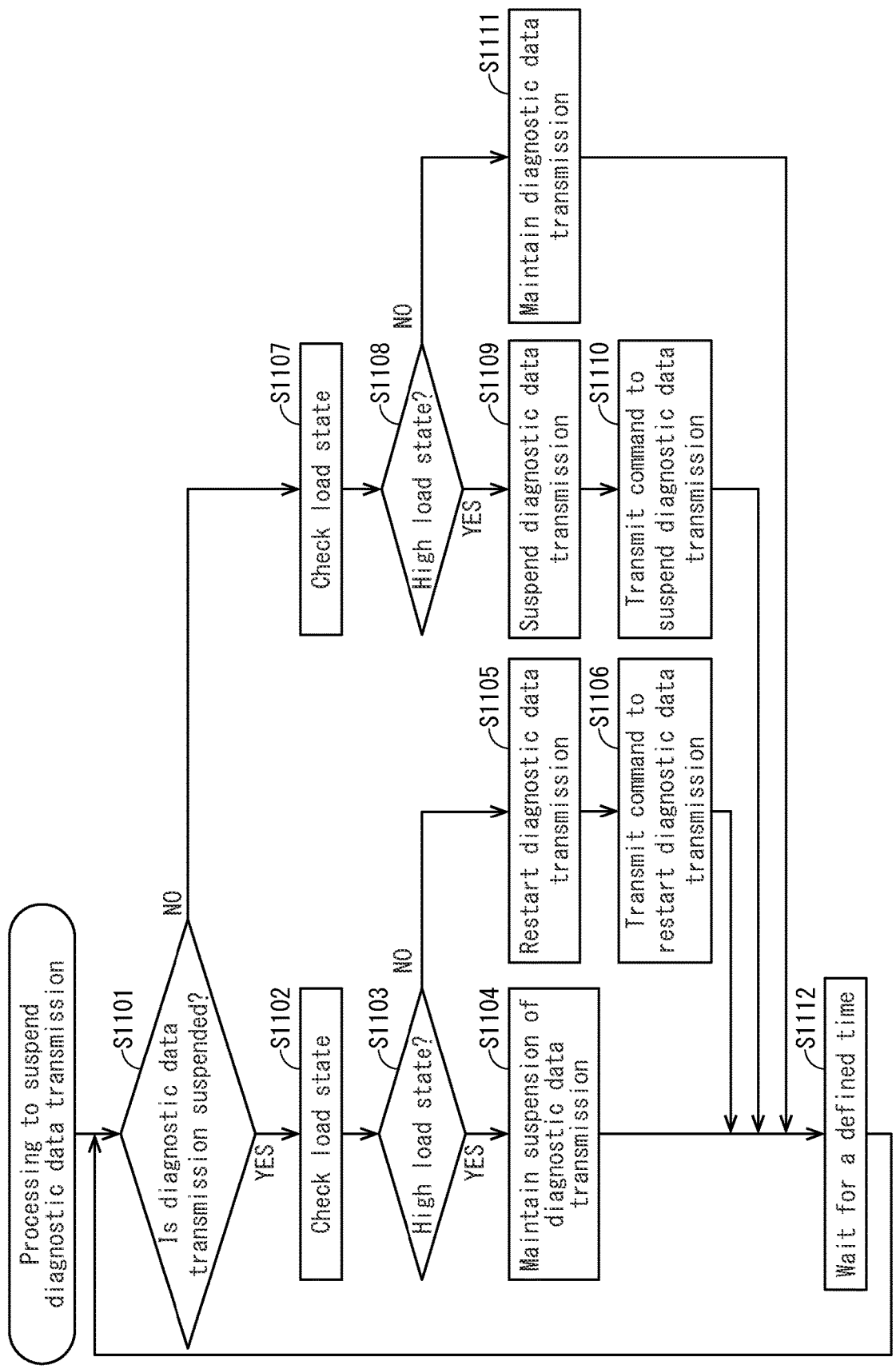
FIG. 11 is a flowchart for describing operations of the primary controller 201.

Processing by the primary controller 201 that temporarily stops transmission of diagnostic data to the diagnostic server 101 is described below with reference to FIG. 11.

When the transmission of the diagnostic data is suspended (S1101: "YES"), the primary controller 201 checks a current processing load (S1102).

When the current processing load is in a high load state (S1103: "YES"), the suspension of transmission of the diagnostic data is maintained (S1104).

On the other hand, when the current processing load is not in the high load state (S1103: "NO"), it is determined that transmission of diagnostic data be restarted (51105), and a command is transmitted to the mechanism controller 200 to restart transmission of diagnostic data (S1106).

When the transmission of the diagnostic data is not suspended (S1101: "NO"), the primary controller 201 checks the current processing load (S1107).

When the current processing load is in the high load state (S1108: "YES"), it is determined that transmission of diagnostic data be suspended (S1109), and a command to suspend transmission of diagnostic data is transmitted to the mechanism controller (S1110).

When the current processing load is not in the high load state (S1108: "NO"), transmission of diagnostic data continues (S1111).

After the processing of steps S1104, S1106, S1110, S1111, processing waits for a defined time (for example, 1000 milliseconds) (S1112) then returns to step S1101 to repeat.

The determination of whether or not the processing load of the primary controller 201 is in the high load state in steps S1102, S1107 is described below with reference to FIG. 12. When a print job is not being executed and an image reading job is not being executed, the primary controller 201 determines that the processing load is normal, or not in the high load state. When a print job is being executed and an image reading job is not being executed, the primary controller 201 determines that the processing load is normal, or not in the high load state. When a print job is not being executed and an image reading job is being executed, the primary controller 201 determines that the processing load is normal, or not in the high load state. When a print job is being executed and an image reading job is being executed, the primary controller 201 determines that the processing load is high. The reason for this is that the DIP unit 415 of the primary controller 201 must convert job data received in a print job into YMCK data and executes image processing including various corrections such as gamma correction, while also in parallel executing various corrections such as shading correction on data read by a scan job to generate image data, and the processing load on the CPU 411 is significantly increased in comparison to other situations.

When the processing load of the primary controller 200 is high, communication pertaining to diagnostic data is temporarily stopped, then restarted after the processing load returns to a normal state, and therefore transmission of diagnostic data to the diagnostic server 101 can be performed without hindering other processing by the image forming device 100.

(1-6) Operations of Mechanism Controller 200

The mechanism controller 200 creates and transmits diagnostic data in addition to processing similar to that of conventional image forming devices, such as initialization and reading of settings when powering on, control of execution of image forming processing, and the like.

The following describes a process of calculating and transmitting a sheet arrival time T as diagnostic data.

The sheet arrival time T is a time required for a sheet to reach a defined position from a defined start position on the sheet conveyance path during image formation.

Figure 3:
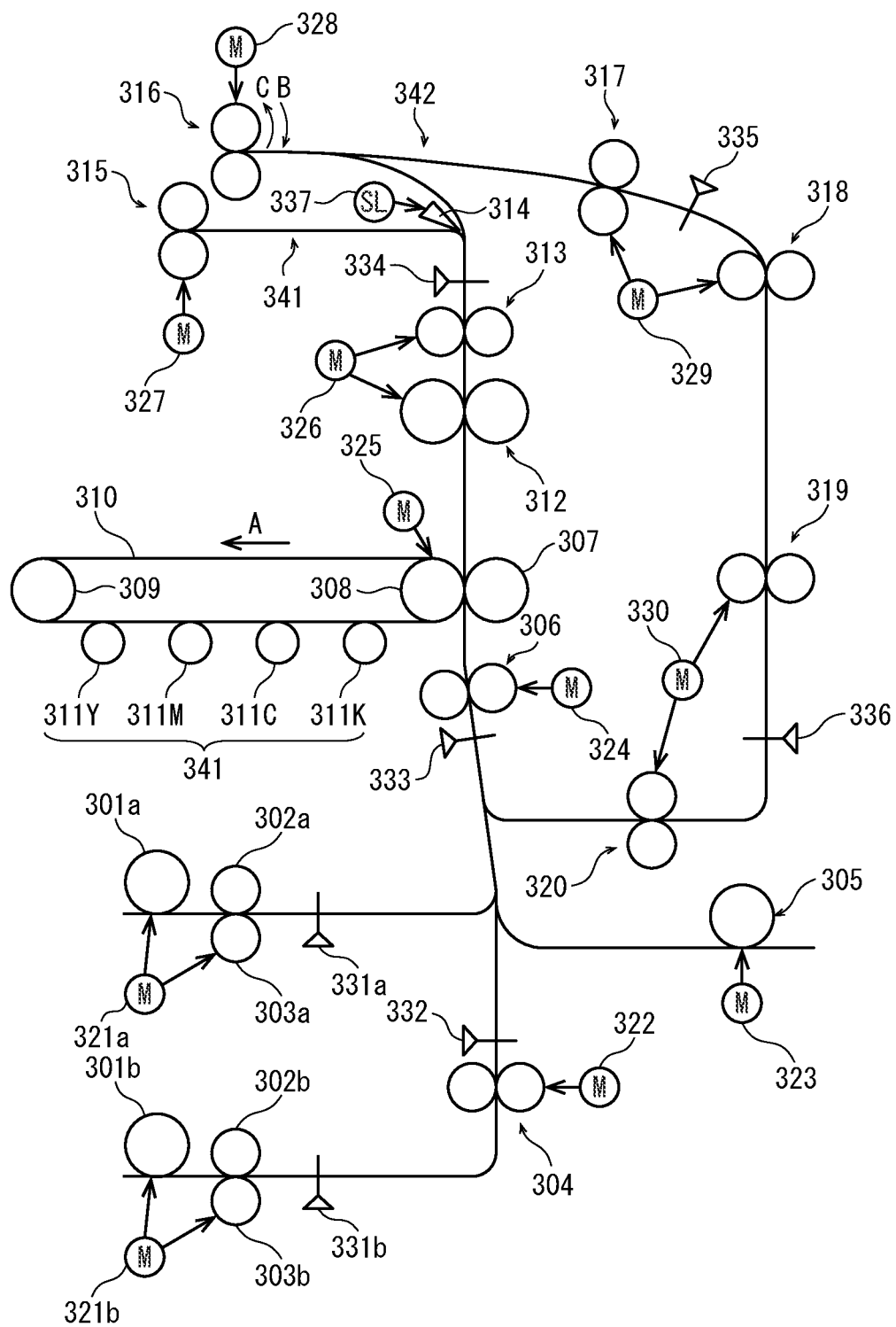
FIG. 3 is a diagram illustrating conveyance paths of a sheet in the image forming device 100.

For example, when executing image forming processing with respect to a sheet stored in a first path sheet tray, a first path pick up roller 301a is used to feed a topmost sheet of a sheet stack stored in the first path sheet tray, and a first path sheet feed roller 302a is used to supply the topmost sheet to the conveyance path while a first path separation roller 303a is used to prevent double feeding of lower sheets, as illustrated in FIG. 3.

When a first path sheet feed sensor 331a detects a leading edge of a sheet supplied by the first path sheet feed roller 302a, the first path sheet feed sensor 331a switches an output signal from off to on. As a result, the mechanism controller 200 detects a timing T1a at which the first path sheet feed sensor 331a detects the sheet.

Subsequently, the sheet is guided to a detection position of a timing sensor 333 by a conveyance guide (not illustrated). On detecting the leading edge of the sheet, the timing sensor 333 switches an output signal from off to on. Accordingly, when the timing sensor 333 outputs a timing T2b at which the sheet is detected, the mechanism controller 200 calculates the sheet arrival time T from the timing T1a to the timing T2b, and the calculated value is transmitted as sensor data to the diagnostic server 101.

Figure 7:
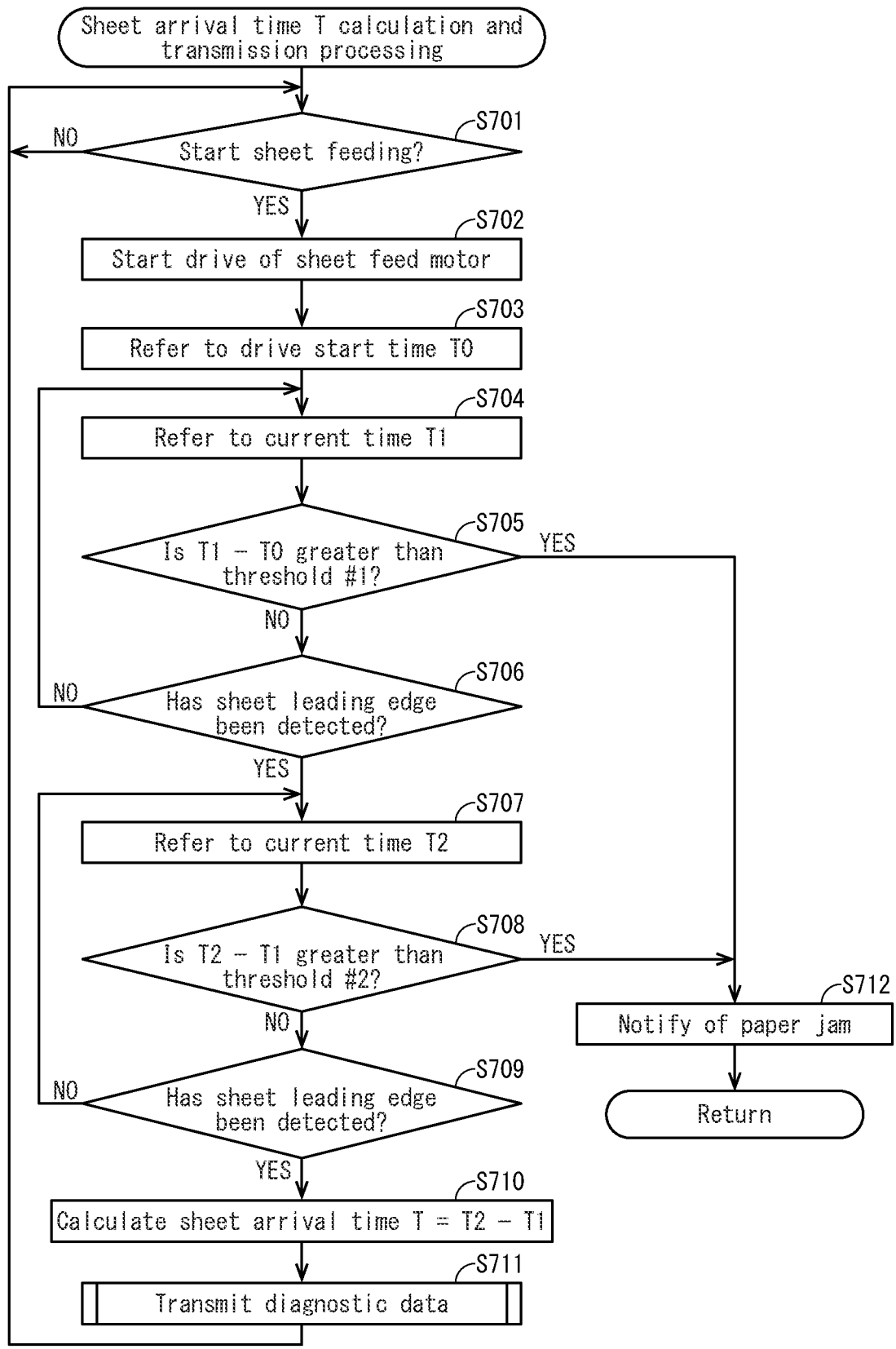
FIG. 7 is a flowchart for describing operations of the mechanism controller 200.

The following is a detailed description of this processing by the mechanism controller 200. As illustrated in FIG. 7, when feeding a sheet (S701: "YES"), the mechanism controller 200 starts driving a sheet feed motor 321a corresponding to a sheet feed tray in which a designated sheet type is stored (S702), and references the timer 404 to obtain a current time as a drive start time T0 (S703).

Subsequently, referring to the timer 404, a current time T1 is acquired (S704), and when an elapsed time from the drive start time (T1−T0) is larger than a defined threshold #1 (S705: "YES"), the leading edge of the sheet has not reached the sheet feed sensor 331a and it is assumed a paper jam has occurred, and therefore the primary controller 201 is notified of the paper jam (S712).

When notified of a paper jam, the primary controller 201 displays a notice on the operation panel 202 notifying a user of the image forming device 100 of the paper jam. The mechanism controller 200 may also notify the diagnostic server 101 of the paper jam.

When the elapsed time from the drive start time (T1−T0) has not become larger than the defined threshold #1 (S705: "NO") and the sheet feed sensor 331a detects the leading edge of the sheet (S706: "YES"), the current time T1 (time at which the leading edge of the sheet is detected by the sheet feed sensor 331a) is stored and processing proceeds to the next step.

A current time T2 is acquired by referencing the timer 404 (S707). When an elapsed time from detection of the leading edge of the sheet by the sheet feed sensor 331a is calculated (T2−T1), and the elapsed time (T2−T1) is larger than a defined threshold #2 (S708: "YES"), the leading edge of the sheet fed from the first path sheet feed tray has not arrived at the timing sensor 333, and it is assumed a paper jam has occurred, and therefore the primary controller 201 is notified of the paper jam (S712).

In this case, as in the case of S706: "YES", the primary controller 201 that has been notified of the paper jam causes display of a notice on the operation panel 202 to notify a user of the image forming device 100 of the paper jam. The mechanism controller 200 may also notify the diagnostic server 101 of the paper jam.

When the leading edge of the sheet is detected by the sheet feed sensor 331a before the elapsed time (T2−T1) (S708: "NO"), and the timing sensor 333 detects the leading edge of the sheet (S709: "YES"), the time T1 is subtracted from the current time T2 (the time when the leading edge of the sheet is detected by the timing sensor 333) to calculate the sheet arrival time T (S710). The mechanism controller 200 transmits the sheet arrival time T to the primary controller 201 as diagnostic data (S711). In this case, the diagnostic data is transmitted to the primary controller via the transmission path 421 used exclusively for transmitting diagnostic data, and not the transmission path 420 used for transmitting instructions pertaining to execution of image forming, and the like. As a result, diagnostic data can be transmitted to the primary controller 201 without hindering execution of other processing by the image forming device, such as image forming processing. Then the primary controller 201 transmits received diagnostic data to the diagnostic server 101.

Subsequently, processing proceeds to step S701, and the processing repeats.

Figure 9:
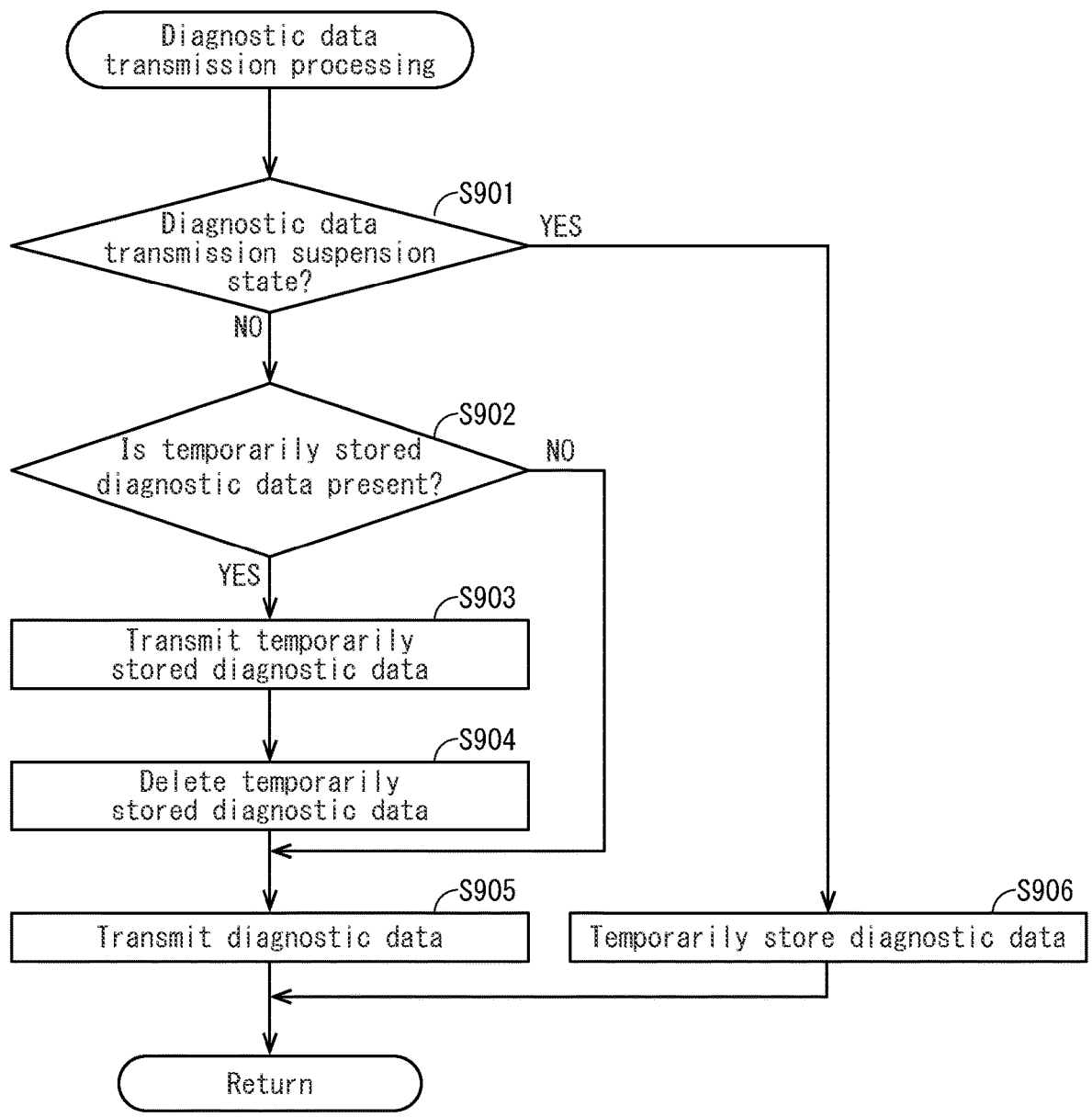
FIG. 9 is a flowchart for describing details of processing transmitting diagnostic data of the mechanism controller 200.
Figure 10:
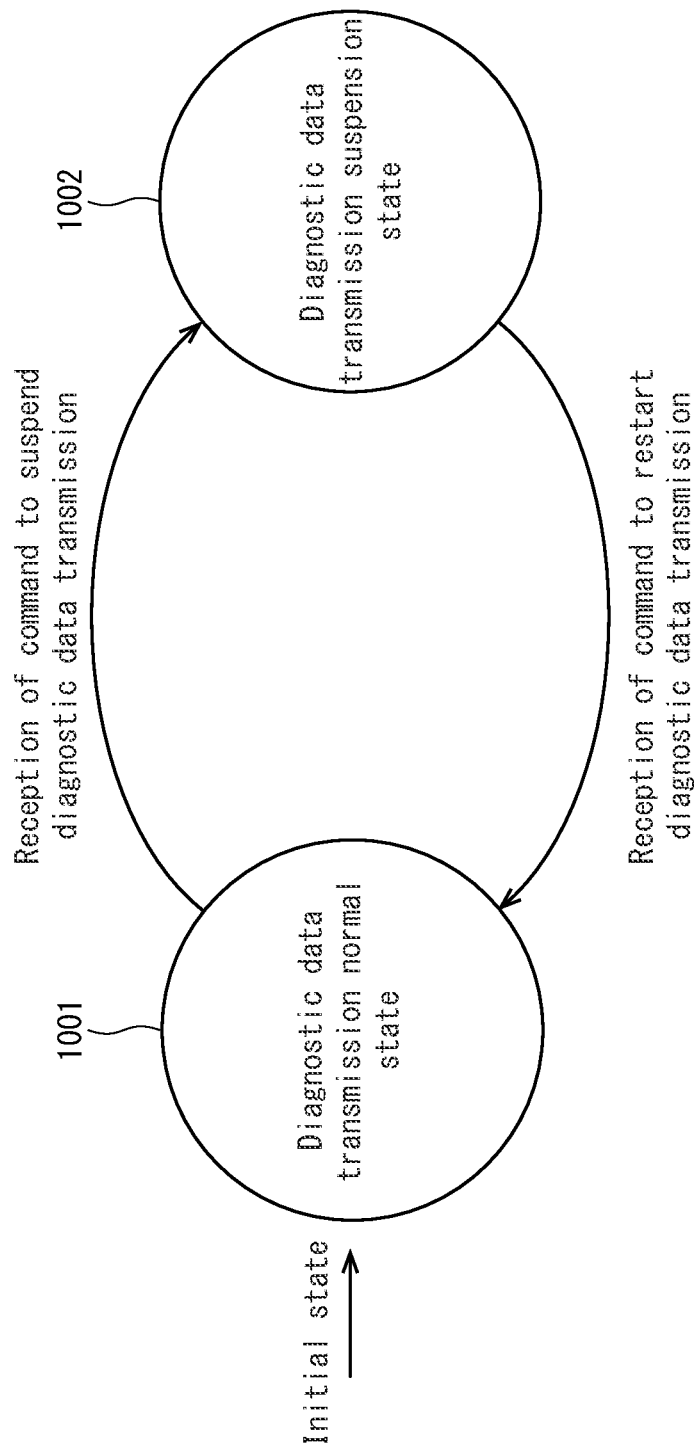
FIG. 10 is a state transition diagram illustrating state transitions of the mechanism controller 200 between a diagnostic data transmission normal state and a diagnostic data transmission temporary stop state.

Transmitting diagnostic data such as the sheet arrival time T to the primary controller 201 (S711) is further described below with reference to FIG. 9 and FIG. 10.

The mechanism controller 200 changes between two states, a diagnostic data transmission suspension state in which transmission of diagnostic data is suspended, and a diagnostic data transmission normal state in which transmission of diagnostic data is performed normally. As illustrated in FIG. 10, the mechanism controller 200 is initially (when powered on) in the diagnostic data transmission normal state, and changes to the diagnostic data transmission suspension state by reception of a command from the primary controller 201 to temporarily stop transmission of diagnostic data. When in the diagnostic data transmission suspension state, the mechanism controller 200 changes to the diagnostic data transmission normal state.

When the current state is the diagnostic data transmission suspension state (S901: "YES"), diagnostic data to be transmitted is temporarily stored in the RAM 403 (S906).

When the current state is not the diagnostic data transmission suspension state (S901: "NO"), whether diagnostic data is being temporarily stored in the RAM 403 is checked (S902).

When diagnostic data is being temporarily stored in the RAM 403 (S902: "YES"), the diagnostic data temporarily stored in the RAM 403 is transmitted to the primary controller 201 via the transmission path 421 (S903) and deleted from the RAM 403 (S904).

When diagnostic data is not being temporarily stored in the RAM 403 (S902: "NO"), or after temporarily stored diagnostic data is deleted, diagnostic data to be transmitted is transmitted to the primary controller 201 via the transmission path 421 (S905).

(1-7) Calculation of Sheet Arrival Time T as Diagnostic Data

If the pickup roller 301a, the sheet feed roller 302a, or the separation roller 303a deteriorates, or paper dust adheres to these rollers, slippage occurs between these rollers and a sheet and the sheet arrival time T is extended. When notifying the diagnostic server 101 of the sheet arrival time T, conventionally, in order to suppress a communication load between the mechanism controller 200 and the primary controller 201, an average value of the sheet arrival time T from every 50 times the sheet arrival time T is calculated, for example, is transmitted to the diagnostic server 101.

When a frequency of slippage between a roller and a sheet is low, even if the sheet arrival time T is extended due to slippage, an infrequently transmitted average value does not fluctuate significantly, and therefore the diagnostic server 101 cannot detect roller deterioration and the like.

Further, for example, when a maximum value of the sheet arrival time T from every 50 times the sheet arrival time T is calculated is transmitted to the diagnostic server 101, the communication load can be suppressed just as when transmitting the average value from 50 calculations, but there is an issue that if slippage occurs for the first calculation of the 50 calculations, detection of deterioration by the diagnostic server 101 is delayed.

Further, if the intent is to wait until frequency of slippage exceeds a certain frequency in order to optimize deteriorated roller replacement frequency, the frequency of slippage cannot be determined only from notification of maximum values, and therefore such notification is inappropriate.

In contrast, according to Embodiment 1, the primary controller 201 is notified of the sheet arrival time T via the transmission path 421 used exclusively for transmission of diagnostic data, and therefore it is possible to notify the primary controller 201 each time the sheet arrival time T is calculated without hindering other processing of the image forming device such as image forming processing.

Accordingly, when notifying the diagnostic server of each sheet arrival time T for each of a plurality of the image forming device 100, slippage of a sheet can be reliably and promptly detected by the diagnostic server 101, and action taken, without a maximum value of the sheet arrival time T being buried by excessive averaging, or a timing and frequency of slippage being unclear due to notification of only a maximum value.

For example, in the table illustrated in FIG. 8, the sheet arrival time T of an image forming device #1 is 270 milliseconds at 10:00:03 on May 10, 2018, but approximately 250 milliseconds at other timings. For example, if the sheet arrival time T is 270 milliseconds only once, and 49 other consecutive times it is 250 milliseconds, an average value for 50 times is $(270+250\times49)/50=250.4$ milliseconds.

If a threshold value of the sheet arrival time T for detecting sheet slippage is 260 milliseconds, 250.4 milliseconds is smaller than the threshold value, and therefore the diagnostic server 101 would not detect the slippage of the sheet. In contrast, according to Embodiment 1, the diagnostic server 101 is notified of all of the sheet arrival times T without calculation of an average value, and the sheet arrival time T at 10:00:03 on May 10, 2018 of 270 milliseconds is larger than the threshold value, and therefore the diagnostic server 101 can detect the slippage of the sheet.

Further, for example, if the sheet arrival time T at 10:00:03 on May 10, 2018 is 270 milliseconds and exceeds the threshold value, and if the diagnostic server 101 causes the image forming device 100 to stop image forming processing, it becomes possible to prevent a paper jam due to sheet slippage occurring in subsequent image forming processing. Paper jams caused by sheet slippage cannot be reliably prevented when determining and notifying the diagnostic server 101 of a maximum value of the sheet arrival time T from 50 repetitions, for example, as in conventional techniques.

The primary controller 201 is notified of the sheet arrival time T via the transmission path 421 used exclusively for transmission of diagnostic data, and therefore other processing of the image forming device such as image forming processing is not hindered, and image forming processing can be executed smoothly.

The mechanism controller 200 and the primary controller 201 may use a shared memory instead of the UART for image forming processing communication.

Further, the mechanism controller 200 may transmit a plurality of the sheet arrival time T at once, where the plurality is within a numerical range that still allows for accuracy of failure diagnostics and life prediction by the diagnostic server 101. When the diagnostic server 101 cannot be notified of the sheet arrival time T due to a failure or maintenance of the diagnostic server 101, the sheet arrival time T may be saved by the mechanism controller 200 or the primary controller 201 until notification becomes possible, then the diagnostic server 101 may be collectively notified of all saved instances of the sheet arrival time T once notification becomes possible.

(1-8) Other Examples of Diagnostic Data

The following describes other examples of diagnostic data.

(1-8-1) Cumulative Rotations of Photosensitive Drum 331

The mechanism controller 200 may transmit a cumulative number of rotations of the photosensitive drum 331 to the diagnostic server 101 as diagnostic data.

The photosensitive drum 331 has a structure in which a photosensitive layer that forms an electrostatic latent image through charging and light exposure is covered with a protective layer. When the protective layer wears down, the photosensitive layer below the protective layer may be worn down, risking uneven charging, uneven light exposure, and uneven development that may cause deterioration of toner image quality.

A state of wear of the protective layer and the photosensitive layer correlates with the cumulative number of rotations of the photosensitive drum 331 (i.e., rotation drum), and therefore if the mechanism controller 200 transmits the cumulative number of rotations of the photosensitive drum 331 to the diagnostic server 101 as diagnostic data, the diagnostic server 101 can estimate the state of wear of the photosensitive drum 331 from the cumulative number of rotations and predict the life of the photosensitive drum 331.

Figure 5:
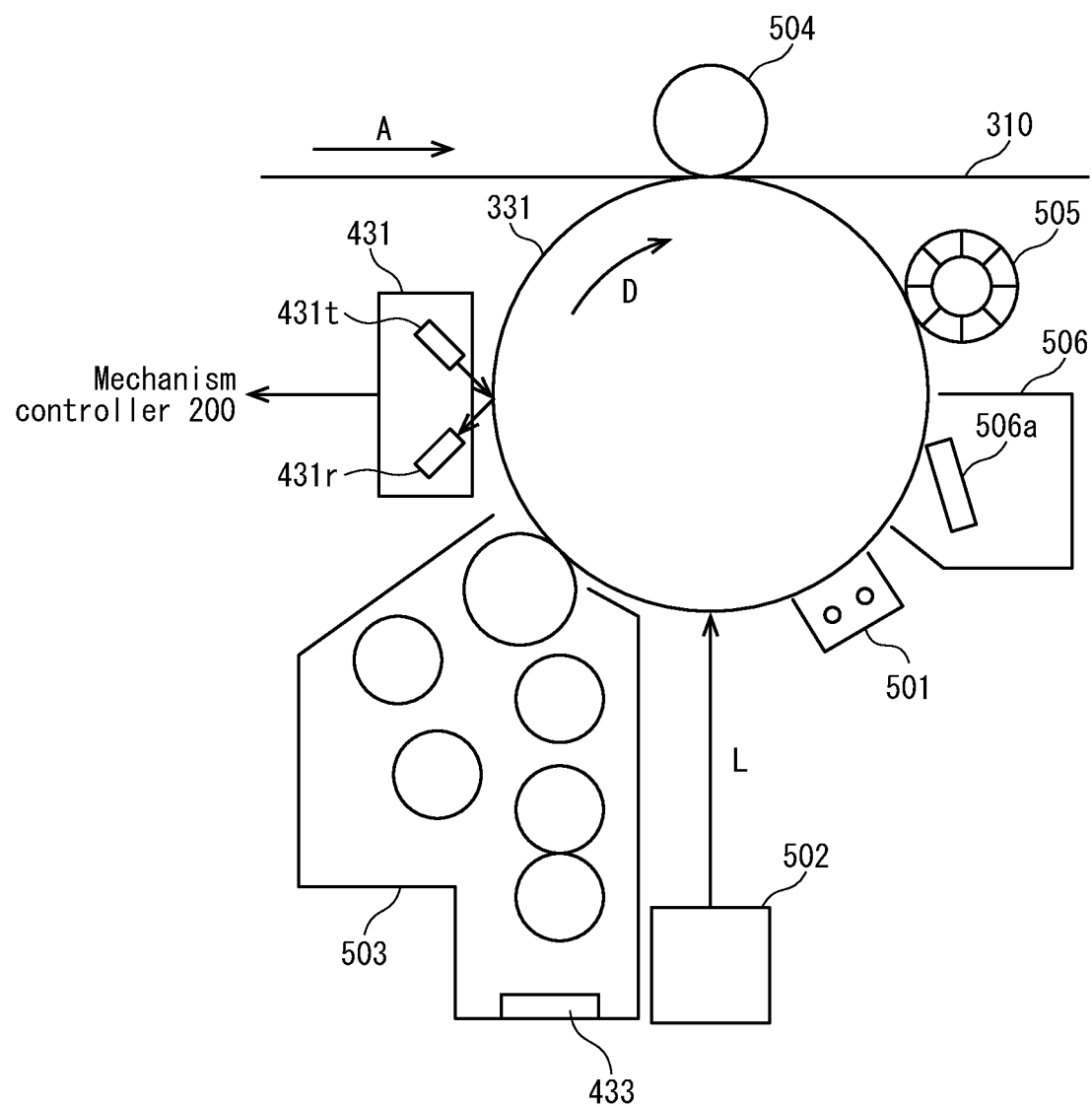
FIG. 5 is a diagram illustrating structure of a surface state sensor 431 and arrangement in an imaging unit.

FIG. 5 is a diagram illustrating structure of the imaging units of the image forming device 100, and the photosensitive drums 331Y, 331M, 331C, 331K for each color YMCK, illustrated in FIG. 3, are also referred to as the photosensitive drum 331.

As illustrated in FIG. 5, in the image forming device 100 during image formation: a charger 501 uniformly electrically charges an outer circumferential surface of the photosensitive drum 331 while the photosensitive drum 331 is driven to rotate in a direction of arrow D; an exposer 502 irradiates the outer circumferential surface of the photosensitive drum 331 with laser light L modulated according to image data, in order to form an electrostatic latent image; a developer unit 503 supplies a corresponding color of toner to visualize the electrostatic latent image as a toner image; and a primary transfer roller 504 electrostatically transfers the toner image onto an outer circumferential surface of an intermediate transfer belt 310 (primary transfer).

The mechanism controller 200 counts the cumulative number of rotations for each color YMCK of the photosensitive drum 331, and each time the photosensitive drum 331 makes a defined number of rotations, the cumulative number of rotations of the photosensitive drum 331 is transmitted to the diagnostic server 101 as diagnostic data.

The mechanism controller 200 uses the LAN interface 400 to transmit the cumulative number of rotations to the diagnostic server 101 for each color YMCK of the photosensitive drum 331 without relaying through the primary controller 201, and therefore a communication load with the primary controller 201 is not increased, and transmission frequency of the cumulative number of rotations can be increased to improve accuracy of failure diagnostics and life prediction by the diagnostic server 101.

If a defined toner patch is formed on the outer circumferential surface of the photosensitive drum 331, and an amount of specular reflection in the toner patch is detected by using a surface state sensor 431, an amount of toner adhered to the outer circumferential surface of the photosensitive drum 331 can be detected. The amount of toner adhering to the outer circumferential surface of the photosensitive drum 331 may vary depending on a state of the outer circumferential surface of the photosensitive drum 331. Thus, if the mechanism controller 200 transmits the amount of specular reflection in the toner patch to the diagnostic server 101 as diagnostic data, the diagnostic server 101 can predict the life of the photosensitive drum 331.

(1-8-2) Fixing Heater Supply Voltage

The mechanism controller 200 may transmit a supply voltage value of a fixing heater to the diagnostic server 101 as diagnostic data.

The image forming device 100 supplies high voltage electric power to the fixing heater (not illustrated) for raising a temperature of a fixing roller 312, and the voltage supplied changes according to deterioration of the fixing heater over time. Thus, if the mechanism controller 200 transmits the supply voltage value of the fixing heater to the diagnostic server 101 as diagnostic data, the diagnostic server 101 can perform failure diagnostics and life prediction for the fixing heater.

(1-8-3) Cartridge Motor Rotation

The mechanism controller 200 may transmit an amount of cartridge motor rotation to the diagnostic server 101 as diagnostic data.

Figure 6:
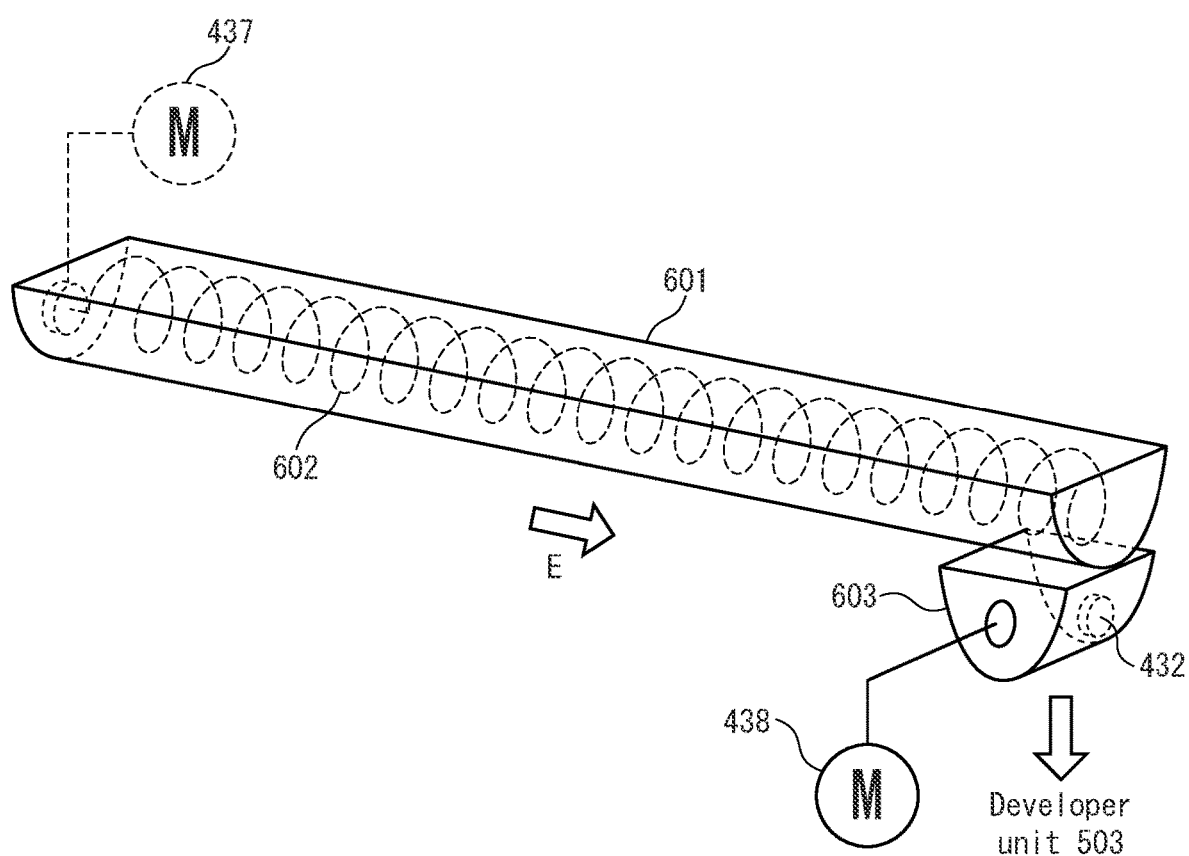
FIG. 6 is a diagram illustrating a structure of a toner cartridge 601 and a sub-hopper 603.

As illustrated in FIG. 6, developer in the toner cartridge 601 is conveyed in a direction indicated by an arrow E by rotation of a spiral conveyor 602 driven by a cartridge motor 437, and falls into a sub-hopper 603. The cartridge motor 437 is a stepping motor, for example, and an amount of developer dropped into the sub-hopper 603 is adjusted by controlling an amount of rotation of the spiral conveyor 602. Developer dropped into the sub-hopper 603 is conveyed to the developer unit 503 by a paddle (not illustrated) rotated by a sub-hopper motor 438. A piezo sensor 432 is provided in the sub-hopper 603 to detect an amount of developer in the sub-hopper 603.

The mechanism controller 200 references an output signal of a toner cartridge door cover sensor 435 to detect that the toner cartridge door cover 222 is opened/closed, and references an output signal of a toner cartridge set sensor 434. When the mechanism controller 200 detects that the toner cartridge 601 is attached, based on the output signal from the toner cartridge set sensor 434, the mechanism controller 200 drives the cartridge motor 437 to start supply of developer.

When a cover to be opened/closed to access the toner cartridge 601 is the front cover 223, the mechanism controller 200 can perform similar processing by referencing an output signal of a front cover sensor 436 that detects an open/closed state of the front cover 223.

Further, the developer unit 503 stores developer therein, and includes a toner carrier ratio (TCR) sensor 433 for detecting toner concentration of the stored developer. As the TCR sensor 433, a magnetic permeability sensor may be used, for example. That is, if attention is paid to the fact that magnetic permeability of toner in developer is different from that of a carrier, toner concentration can be specified by detecting magnetic permeability of the developer.

The mechanism controller 200 references an output signal of the TCR sensor 433, and also drives the cartridge motor 437 to supply developer to the developer unit 503 from the toner cartridge 601 when it is determined that toner concentration in the developer unit 503 is low.

Thus, if the mechanism controller 200 transmits a rotation amount of the cartridge motor 327 to the diagnostic server 101 as diagnostic data, the diagnostic server 101 can be informed of a remaining toner amount in the toner cartridge 601 by using the diagnostic data, and therefore life of the toner cartridge 601 can be predicted.

(1-8-4) Surface State of Photosensitive Drum 331

If the mechanism controller 200 transmits a surface state of the photosensitive drum 331 to the diagnostic server 101 as diagnostic data, the diagnostic server 101 can predict life of a lubricant supplier 505 that supplies lubricant to the surface of the photosensitive drum 331.

A cleaning device 506 illustrated in FIG. 5 uses a cleaning blade 506a to scrape off and discard toner remaining on the outer circumferential surface of the photosensitive drum 331 after the primary transfer. During this cleaning, if friction between the photosensitive drum 331 and the cleaning blade 506a is too great, the cleaning blade 506a is bent by the frictional force, making it difficult to scrape off residual toner.

Thus, in order to reduce the frictional force, a lubricant is applied to the photosensitive drum 331 using the lubricant supplier 505. However, when the lubricant supplier 505 is consumed due to deterioration over time, an amount of lubricant applied may decrease, and the frictional force between the photosensitive drum 331 and the cleaning blade 506a may not be sufficiently reduced.

The surface state sensor 431 is a specular reflection type of surface state sensor disposed facing the outer circumferential surface of the photosensitive drum 331 between the developer unit 503 and the primary transfer roller 504 in the rotation direction of the photosensitive drum 331. The surface state sensor 431 includes a light emitting element 431t comprising a light emitting diode (LED) and a light receiving element 431r comprising a phototransistor. The light emitting element 431t irradiates the outer circumferential surface of the photosensitive drum 331 with laser light at an incident angle of 45°, and the light receiving 431r element receives specular reflection light from the photosensitive drum 331, or in other words light reflected at a reflection angle of 45°.

When an appropriate amount of lubricant is present on the surface of the photosensitive drum 331, the surface of the photosensitive drum 331 is a matte white and reflects diffusely, but as the amount of lubricant on the photosensitive surface decreases, the surface of the photosensitive drum 331 becomes closer to a mirror-like surface, and light reflected from the photosensitive drum 331 includes more of a specular reflection component.

Accordingly, the amount of specular reflection light received by the light receiving element 431r changes in proportion to an amount of lubricant on the outer circumferential surface of the photosensitive drum 331. An output signal of the surface state sensor 431, or in other words an output signal of the light receiving element 431r is input to the mechanism controller 200. When the mechanism controller 200 references the output signal of the surface state sensor 431 to generate and sends diagnostic data to the diagnostic server 101, the diagnostic server 101 can reference the diagnostic data to predict life of the lubricant supplier 505.

(1-8-5) Sheet Arrival Time T

As the sheet arrival time T, the following definitions can be used in addition to that described above.

For example, when executing image forming processing with respect to a sheet stored in the second path sheet feed tray, the second path pickup roller 301b is used to pick up a topmost sheet of a sheet stack stored in the second path sheet feed tray, and the second path sheet feed roller 302b is used to feed the sheet to the conveyance path while the second path separation roller 303b is used to prevent double-feeding of lower sheets in the sheet stack.

When the second path sheet feed sensor 331b detects a leading edge of a sheet supplied by the second path sheet feed roller 302b, the second path sheet feed sensor 331b switches an output signal from off to on. As a result, the mechanism controller 200 detects a timing T1b at which the second path sheet feed sensor 331b detects the sheet.

Subsequently, the sheet is guided to a detection position of the manual multi-sheet second path vertical conveyance sensor 332 by a conveyance guide (not illustrated). On detecting the leading edge of the sheet, the second path vertical conveyance sensor 332 switches an output signal from off to on. Accordingly, when the second path vertical conveyance sensor 332 outputs a timing T2b at which the sheet is detected, the mechanism controller 200 calculates a second path sheet arrival time T from the timing T1b to the timing T2b, and the second path sheet arrival time T is transmitted to the diagnostic server 101 as sensor data.

The first path pickup roller 301a, the first path sheet feed roller 302a, and the first path separation roller 303a are rotatably driven by the first path sheet feed motor 321a, while the second path pickup roller 301b, the second path sheet feed roller 302b, and the second path separation roller 303b are rotatably driven by the second path sheet feed roller 321b. The mechanism controller 200 controls drive of the first path sheet feed motor 321a and the second path sheet feed motor 321b.

The image forming device 100 can supply sheets from a manual multi-sheet feed tray in addition to the first path sheet feed tray and the second path sheet feed tray. Sheets set in the manual multi-sheet feed tray are fed one-by-one starting with a topmost sheet by using a manual multi-sheet feed roller 305 that is rotationally driven by a manual multi-sheet feed motor 323.

A sheet supplied as described above is further conveyed as described below, to have an image formed thereon.

The timing motor 324 stops rotation of the timing roller 306 prior to the arrival of the sheet, and starts rotation of the timing roller 306 after a defined time elapses from detection of a leading edge of the sheet by the second path vertical conveyance sensor 332. In this way, the sheet is conveyed to abut against a conveyance nip of the timing roller 306 whose rotation is stopped, then while the leading end of the sheet is prevented from passing through the conveyance nip, the sheet arches, thereby correcting skew. Further, by controlling a timing of starting rotation of the timing roller 306, a toner image can be transferred to an appropriate position on the sheet.

An imaging unit 341 includes the photosensitive drums 331Y, 331M, 331C, 331K for forming toner images of yellow (Y), magenta (M), cyan (C), and black (K), and sequentially forms YMCK toner images on outer circumferential surfaces of the photosensitive drums 331Y, 331M, 331C, 331K, by using the charger 501, the exposer 502, and the developer 503.

The toner images of each color are electrostatically transferred by the primary transfer roller 504 from the outer circumferential surfaces of the photosensitive drums 331Y, 331M, 331C, 331K to the outer circumferential surface of the intermediate transfer belt 310 so as to overlap with each other to form a color toner image. The intermediate transfer belt 310 is wound around a drive roller 308 and a driven roller 309, and a main motor 325 rotationally drives the drive roller 308 to cause the intermediate transfer belt 310 to move in a direction indicated by an arrow A.

A secondary transfer roller 307 is pressed against the drive roller 308 with the intermediate transfer belt 310 disposed therebetween, forming a secondary transfer nip. The timing roller 306 conveys the sheet to the secondary transfer nip while the intermediate transfer belt 310 conveys the color toner image to the secondary transfer nip, and the color toner image is electrostatically transferred to the sheet at the secondary transfer nip.

The sheet onto which the color toner image has been electrostatically transferred has the color toner image heat-fixed by a fixing roller 312, and is then further conveyed by a sheet pre-discharge roller 313. A sheet discharge sensor 334 is disposed downstream of the sheet pre-discharge roller 313 in the sheet conveyance direction, and detects the leading edge of the sheet. A reverse path switching solenoid 337 switches a direction of a switcher 314 according to timing of detection of the leading edge of the sheet by the sheet discharge sensor 334.

As a result, conveyance of the sheet is switched to either a sheet discharge path 341 or a sheet reverse path 342. In particular, when performing double-sided printing over a plurality of pages, the direction of the switcher 314 is switched due to detection of the leading edge of the sheet by the sheet discharge sensor 334, in order to alternately guide a sheet printed on only one side to the sheet reverse path 342 and a sheet printed on both sides to the sheet discharge path 341.

The sheet guided to the sheet discharge path 341 is discharged to outside by a sheet discharge motor 327 rotating a sheet discharge roller 315. On the other hand, the sheet guided to the sheet reverse path 342 is further drawn into the sheet reverse path 342 by a reversing motor 328 rotationally driving a reversing roller 316 in a direction of an arrow B, after which the reversing motor 328 rotates in reverse to rotationally drive the reversing roller 316 in a direction of an arrow C, sending the sheet towards an automatic duplex unit (ADU) conveyance roller 317.

The sheet is conveyed by ADU conveyance rollers 317, 318, 319, 320 along the sheet reverse path 342 until a leading edge of the sheet hits the timing roller 306.

The ADU conveyance rollers 317, 318 are rotationally driven by an ADU conveyance motor 329, and the ADU conveyance rollers 319, 320 are rotationally driven by an ADU conveyance motor 330. Further, by monitoring a timing at which ADU conveyance sensors 335, 336 detect the leading edge of the sheet, it is possible to detect a paper jam on the sheet reverse path 342.

A color toner image is then electrostatically transferred to a back surface of the sheet that has entered the secondary transfer nip via the sheet reverse path 342, the color toner image is thermally fixed by the fixing roller 312, and the sheet guided to the sheet discharge path 341 by the switcher 314 and discharged outside.

According to the image forming device 100 with such a structure, the mechanism controller 200 references output signals from at least the first path sheet feed sensor 331a, the second path sheet feed sensor 331b, the second path vertical conveyance sensor 332, the timing sensor 333, the discharge sensor 334, and the ADU conveyance sensors 335, 336, in order to detect the timing of arrival of the leading edge and/or trailing edge of the sheet at the detection position of a corresponding sheet sensor.

As a result, the first path sheet feed motor 321a, the second path sheet feed motor 321b, the second path vertical conveyance motor 322, the manual multi-sheet feed motor 323, the timing motor 324, the main motor 325, the fixing motor 326, the sheet discharge motor 327, the reverse motor 328, and the ADU conveyance motors 329, 330, also collectively referred to as drive motors 321, and the reverse path switching solenoid 337 are drive-controlled.

Further, the mechanism controller 200 detects occurrence of a paper jam from a delay in arrival timing.

Further, if the mechanism controller 200 calculates the sheet arrival time T that indicates the arrival timing and transmits the sheet arrival time T to the diagnostic server 101, the diagnostic server 101 can perform failure diagnostics and life prediction by referencing the sheet arrival time T, determining deterioration due to wear and degradation due to adhesion of paper dust is occurring in the timing roller 306, the secondary transfer roller 307, the fixing roller 312, the sheet pre-discharge roller 313, the sheet discharge roller 315, the reverse roller 316, or the ADU conveyance rollers 317, 318, 319, 320.

(1-8-6) Torque Values of Drive Motors 321

The mechanism controller 200 may calculate torque values of the drive motors 321 by referencing drive currents of the drive motors 321, and may transmit the torque values to the diagnostic server 101 as diagnostic data.

Torque values of the drive motors 321 change according to states of wear of the first path pickup roller 301a, the first path sheet feed roller 302a, the first path separation roller 303a, the second path pickup roller 301b, the second path sheet feed roller 302b, the second path separation roller 303b, the second path vertical conveyance roller 304, the manual multi-sheet feed roller 305, the timing roller 306, the secondary transfer roller 307, the fixing roller 312, the sheet pre-discharge roller 313, the discharge roller 315, the reverse roller 316, and the ADU conveyance rollers 317, 318, 319, 320, also collectively known as rollers 301.

Thus, if the mechanism controller 200 transmits torque values of the drive motors 321 as diagnostic data to the diagnostic server 101, the diagnostic server 101 can predict the life of the rollers 301.

[2] EMBODIMENT 2

The image forming device diagnostic system 1 pertaining to Embodiment 2 can set permission and prohibition of transmission of diagnostic data, and only when transmission of diagnostic data is set to be permitted, and a user of the image forming device 100 has a contract to use a diagnostic service from the diagnostic server 101, is diagnostic data transmitted to the diagnostic server 101.

According to Embodiment 2, "permission" or "prohibition" of transmission of diagnostic data is set using the operation panel 202. A setting value is stored in, for example, the HDD 414 of the primary controller 201, and the mechanism controller 200 is notified of the setting value by the primary controller 201 in situations such as when powered on. Further, contract content indicating whether or not a diagnostic service contract has been made is also stored in the HDD 414 of the primary controller 201, and the mechanism controller 200 is notified of the contract content by the primary controller 201 in situations such as when power is turned on.

Figure 13:
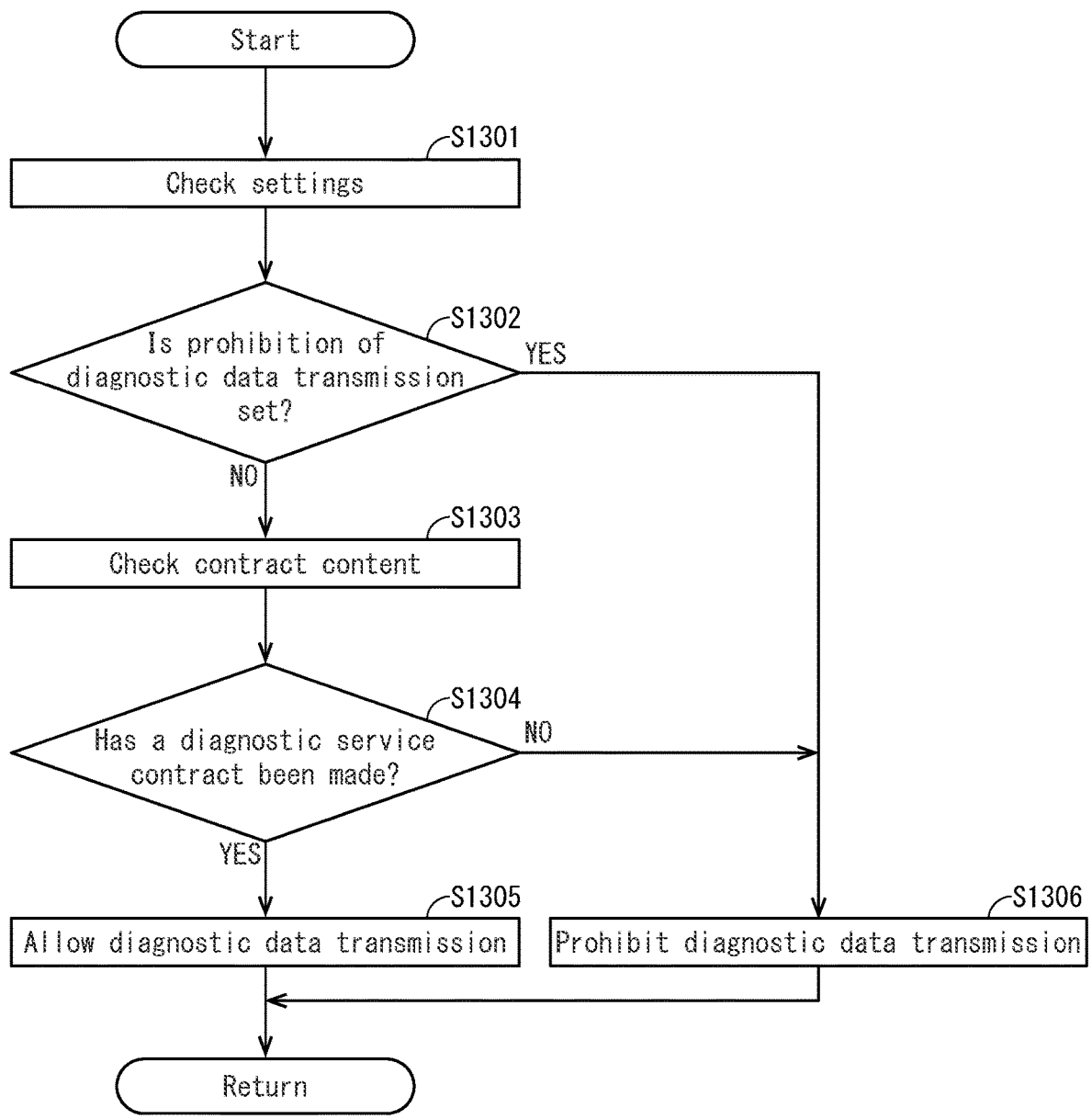
FIG. 13 is a flowchart for describing operations of the mechanism controller 200 pertaining to Embodiment 2.

As illustrated in FIG. 13, the mechanism controller 200 references the setting value received from the primary controller 201 when the image forming device 100 is powered on, in order to check whether or not transmission of diagnostic data is prohibited (S1301).

When transmission of diagnostic data is prohibited (S1302: "YES"), transmission of diagnostic data from the mechanism controller 200 to the diagnostic server 101 via the primary controller 201 is prohibited (S1306).

When transmission of diagnostic data is not prohibited (S1302: "NO"), the mechanism controller 200 references the contract content received from the primary controller 201 when the image forming device is powered on, in order to check whether or not the diagnostic service contract has been made (S1303). When the diagnostic service contract has not been made (S1304: "NO"), transmission of diagnostic data from the mechanism controller 200 to the diagnostic server 101 via the primary controller 201 is prohibited (S1306).

When the diagnostic service contract has been made (S1304: "YES"), transmission of diagnostic data from the mechanism controller 200 to the diagnostic server 101 via the primary controller 201 is permitted (S1305).

In this way, the mechanism controller 200 transmitting diagnostic data to the diagnostic server 101 when it need not be transmitted can be prevented, preventing an increase in processing load on the mechanism controller 200, the primary controller 201, and the diagnostic server 101, and preventing an increase in load on the communication network 110. In particular, when a number of image forming devices in a plurality of the image forming device 100 under the diagnostic server 101 is large, preventing unnecessary transmission is effective in reducing a processing load of the diagnostic server 101.

[3] EMBODIMENT 3

The mechanism controller 200 pertaining to Embodiment 3 takes an average value of the sheet arrival time T in a range in which the diagnostic server 101 can detect slippage of the sheet and transmits the average value to the diagnostic server 101.

Figure 14:
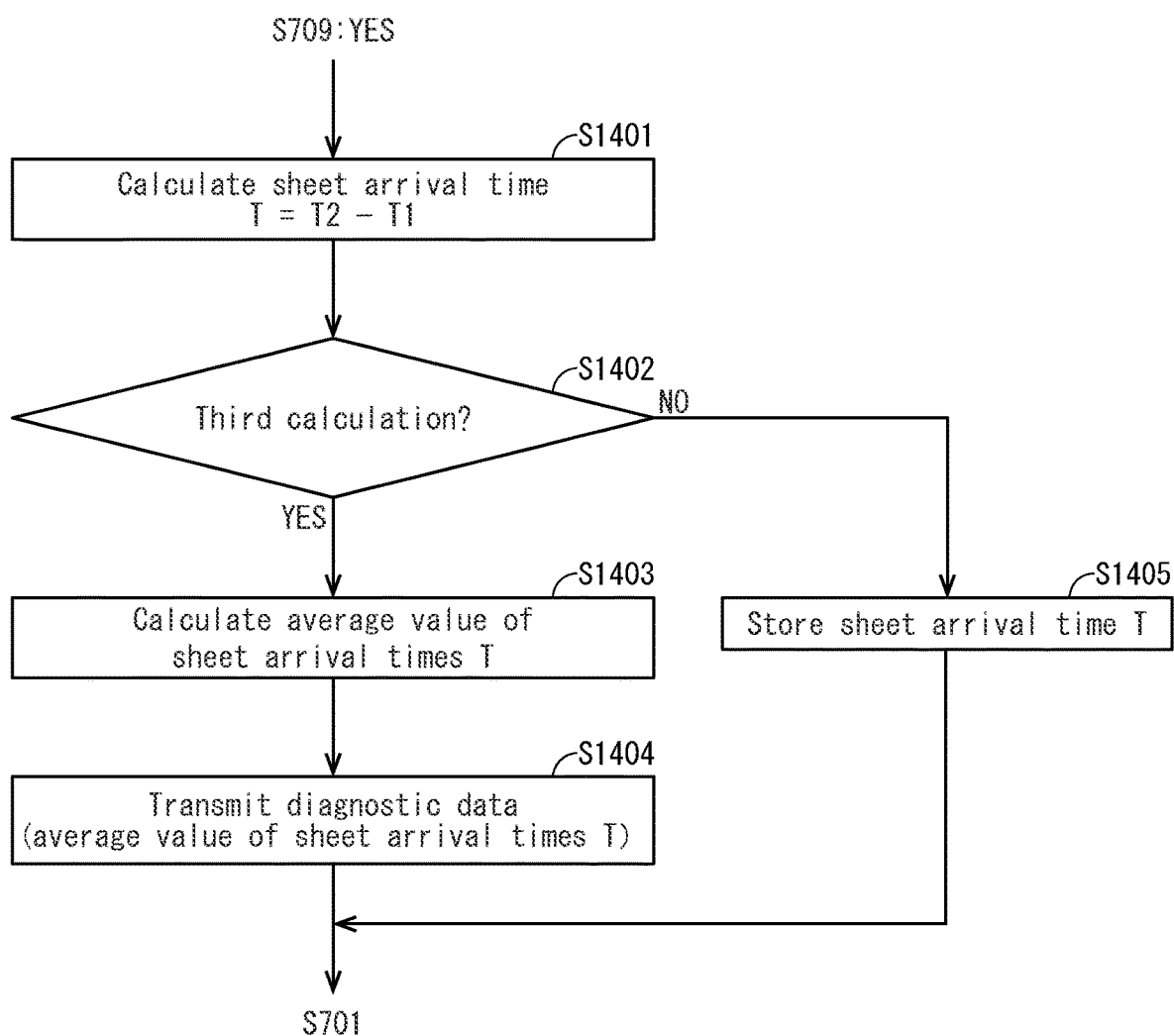
FIG. 14 is a flowchart for describing operations of the mechanism controller 200 pertaining to Embodiment 3.

FIG. 14 is a flowchart describing operations of the mechanism controller 200, and illustrates processing when "YES" is true for step S709 in FIG. 7, according to Embodiment 3.

As illustrated in FIG. 14, the mechanism controller 200 calculates the sheet arrival time T (S1401), and if this calculation of the sheet arrival time T is the third such calculation after transmitting a previous average value of the sheet arrival time T to the diagnostic server 101 (S1402: "YES"), the mechanism controller 200 calculates an average value of three calculations of the sheet arrival time T (S1403) and transmits the average value to the diagnostic server 101 via the primary controller 201 (S1404). If the calculation is not the third such calculation (S1402: "NO"), the sheet arrival time T is stored for later calculation of the average value (S1405). After the processing of steps S1404, 1405, processing proceeds to step S701 of FIG. 7, and the processing described is repeated.

As illustrated in FIG. 15A, according to Embodiment 3, the average value of three sheet arrival times T for sheet 1 through 3 is calculated, and only the average value is transmitted to the diagnostic server 101 without transmitting each of the sheet arrival times T to the diagnostic server 101. Further, as illustrated in FIG. 15B, each of a plurality of the image forming device 100 transmits only the average value to the diagnostic server 101.

For example, if the image forming device 100 has an image forming speed of 60 sheets per minute and transmits all sheet arrival times T to the diagnostic device 101, the sheet arrival time T is transmitted every second. Further, when there is a plurality of the image forming device 100, the number of the sheet arrival times T transmitted every second may be the same as the number of image forming devices, increasing the load on the communication network 110.

In contrast, if the average value is transmitted to the diagnostic server 101 instead of the sheet arrival time T, the number of transmissions of diagnostic data can be reduced by 1 divided by the number of sheet arrival times T used to calculated the average value. In this sense, a data amount of the diagnostic data can be compressed.

Further, if the number of sheet arrival times T used to calculate the average value is small, slippage of sheets can still be accurately detected. For example, when the number of sheet arrival times T used to calculate the average value is three, the average value even when sheet slippage only occurs in one of the sheet arrival times T is larger than the average value when sheet slippage does not occur, for example 268.0 milliseconds in FIG. 16A compared with 261.3 milliseconds in FIG. 16B makes for a difference of 6.7 milliseconds.

In other words, if the number of the sheet arrival times T used to calculate the average value is such that the average value is always larger when slippage occurs compared to when slippage does not occur, then an intermediate value between these two types of average value can be used as a threshold value, and by comparing the threshold value to the average value of the sheet arrival times T, sheet slippage, or in other words deterioration of the rollers 302, can be accurately detected.

[4] EMBODIMENT 4

According to Embodiment 4, a selection is made of whether the mechanism controller 200 transmits all of the sheet arrival times T or only the average values of the sheet arrival times T to the diagnostic server 101 via the primary controller 201. A format of diagnostic data to be transmitted to the diagnostic server 101 ("diagnostic data format") is set, for example, using the operation panel 202 as either all the sheet arrival times T ("all data") or only average values of the sheet arrival times T ("average values"). A value for the setting of the diagnostic data format is stored in, for example, the HDD 414 of the primary controller 201, and the mechanism controller 200 is notified of the value by the primary controller 201 in situations such as when powered on.

Figure 17:
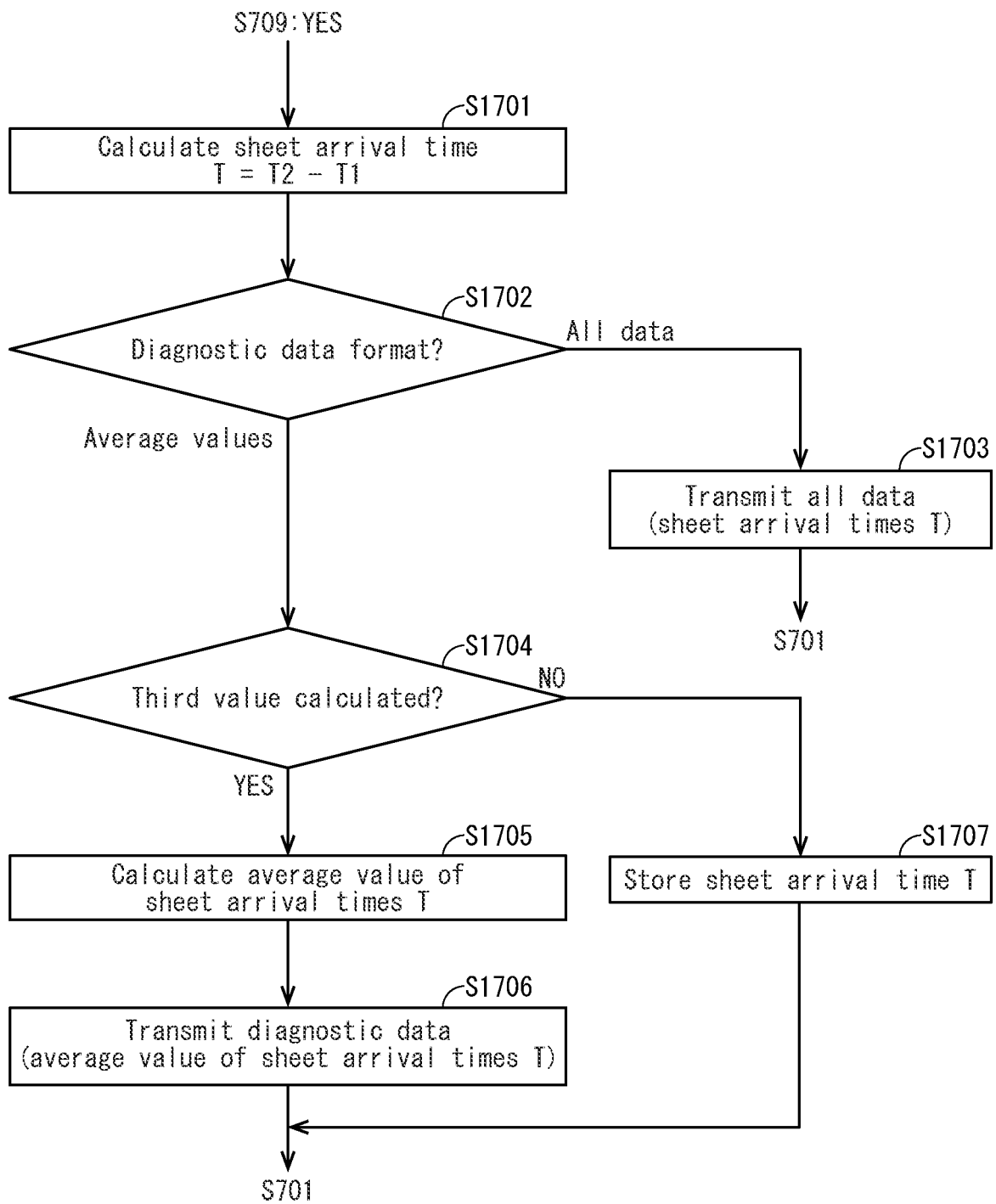
FIG. 17 is a flowchart for describing operations of the mechanism controller 200 pertaining to Embodiment 4.

FIG. 17 is a flowchart describing operations of the mechanism controller 200, and illustrates processing when "YES" is true for step S709 in FIG. 7.

As illustrated in FIG. 17, the mechanism controller 200 calculates the sheet arrival time T (S1701), and if the diagnostic data format to be transmitted to the diagnostic server 101 is "all data" (S1702: "YES"), the calculated sheet arrival time T is transmitted as is to the diagnostic server 101 via the primary controller 201 (S1703).

On the other hand, if the diagnostic data format is "average values", then if the sheet arrival time T calculated in step S1701 is the third such calculated value since transmission of an average value of the sheet arrival times T to the diagnostic server 101 (S1704: "YES"), the average value of the three sheet arrival times T is calculated (S1705), and the average value is transmitted to the diagnostic server 101 via the primary controller 201. If the calculation is not the third such calculation (S1704: "NO"), the sheet arrival time T is stored for later calculation of the average value (S1707). After the processing of steps S1706, 1707, processing proceeds to step S701 of FIG. 7, and the processing described is repeated.

As illustrated in FIG. 18A, according to Embodiment 4, when the diagnostic data format is "all data", only the sheet arrival time T is calculated, and is transmitted each time to the diagnostic server 101.

When the diagnostic data format is "average values", the average value of 3 consecutive sheet arrival times T is calculated, as illustrated in FIG. 18B, and is transmitted to the diagnostic server 101 without transmitting the sheet arrival times T. In this case, as illustrated in FIG. 18C, the diagnostic server 101 sequentially stores the average values of the sheet arrival times T.

In this way, by selecting the diagnostic data format according to the load of the communication network 110, excessive load on the communication network 110 due to the image forming device 100 notifying the diagnostic server 101 of diagnostic data can be prevented.

Further, when the load of the communication network 110 is low, or the communication capacity of the communication network 110 is sufficiently large, "all data" can be selected as the diagnostic data format to improve accuracy of failure diagnostics and life prediction.

The diagnostic data format in which the image forming device 100 transmits diagnostic data may be added to each piece of the diagnostic data as information indicating the diagnostic data format, and the diagnostic server 101 may be notified of the diagnostic data format each time the diagnostic data format is set for the image forming device 100.

When the diagnostic data format is switched, there is a possibility that the sheet arrival times T and the average values may be mixed in diagnostic data accumulated in the diagnostic server 101, but the diagnostic server 101 can determine whether the diagnostic data is a sheet arrival time T or an average value upon receiving the diagnostic data, and therefore both can be handled separately when performing failure diagnostics and life prediction.

[5] EMBODIMENT 5

According to Embodiment 5, in addition to the failure diagnostics and life prediction by the diagnostic server 101 using the sheet arrival time T, a diagnostic parent server 2201 (i.e. diagnostic master server) analyzes the average values and diagnostic results of the diagnostic server 101 and feeds back results of this analysis to the diagnostic server 101 to update algorithms for failure diagnostics and life prediction and improve diagnostic accuracy.

As illustrated in FIG. 19, the image forming device diagnostic system 1 includes a plurality of in-house systems in which the image forming device 100, the diagnostic server 101, and the PC 102 are connected by a LAN 2202, and the LAN 2202 uses a router 2203 to connect to the Internet 2204. The diagnostic parent server 2201 is connected to the Internet 2204 and communicates with each of the diagnostic servers 101 via the Internet 2204.

Figure 20A:
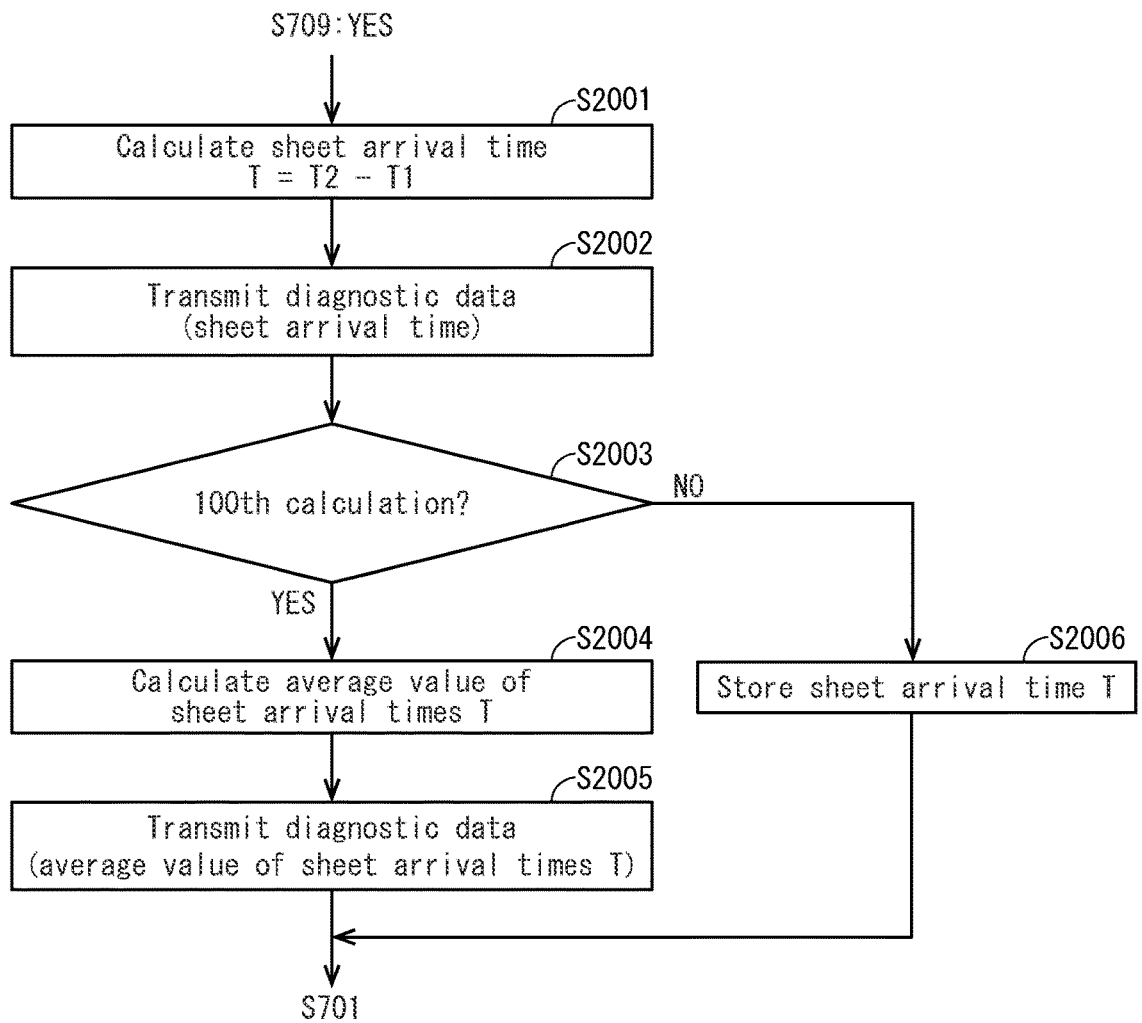
FIG. 20A is a flowchart describing operations of the mechanism controller 200 pertaining to Embodiment 5.

FIG. 20A is a flowchart describing operations of the mechanism controller 200, and illustrates processing when "YES" is true for step S709 in FIG. 7.

As illustrated in FIG. 20A, the mechanism controller 200 calculates the sheet arrival time T (S2001). FIG. 21A is a table illustrating examples of sheet arrival times T and average values calculated by the mechanism controller 200. The mechanism controller 200 transmits the sheet arrival time T to the diagnostic server 101 via the primary controller 201 (S2002). FIG. 21B illustrates an example of a sheet arrival time T to be transmitted to the diagnostic server 101 by the mechanism controller 200.

Figure 20B:
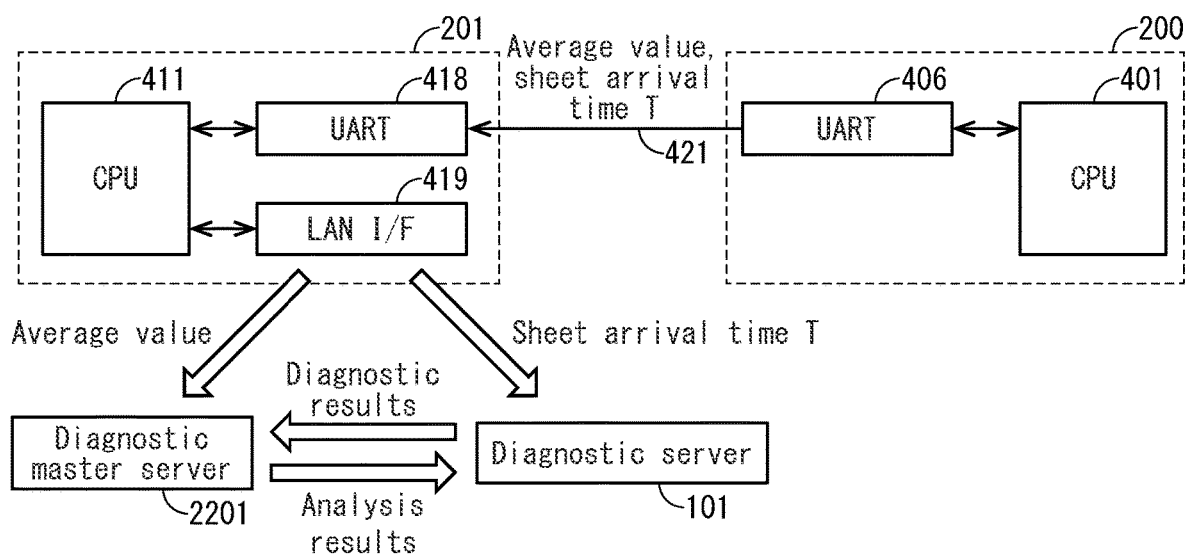
FIG. 20B is a block diagram illustrating structure of the mechanism controller 200 and the primary controller 201.

As illustrated in FIG. 20B, the mechanism controller 200 uses the UART 406 to transmit the sheet arrival time T to the primary controller 201. When the primary controller 200 receives the sheet arrival time T using the UART 418, the primary controller 201 transmits the sheet arrival time T to the diagnostic server 101 via the LAN 2202. The diagnostic server 101 accumulates values for the sheet arrival time T as illustrated in FIG. 21D, performs failure diagnostics and life prediction using the sheet arrival times T, and transmits results of diagnostics to the diagnostic parent server 2201 via the LAN 2202 and the Internet 2204.

Next, the number of times the sheet arrival time T has been calculated since an average value of the sheet arrival times T was last transmitted to the diagnostic parent server 2201 is referenced, and if the number of times the sheet arrival time T has been calculated has not reached a defined number, for example 100 times (S2003: "NO"), the sheet arrival time T is stored (S2006). If the number of times the sheet arrival time T has been calculated reaches 100 (S2003: "YES"), the average value of the 100 sheet arrival times T is calculated (S2004).

FIG. 21A illustrates examples of average values of the sheet arrival time 110. The mechanism controller 200 transmits the average value to the diagnostic parent server 2201 via the primary controller 201 (S2005). FIG. 21C illustrates an example of an average value transmitted to the diagnostic parent server 2201 via the primary controller 201.

As illustrated in FIG. 21B, the mechanism controller 200 uses the UART 406 to transmit the average value to the primary controller 201. When the primary controller 201 receives the average value using the UART 418, the primary controller 201 transmits the average value to the diagnostic parent server 2201 via the LAN 2201 and the Internet 2204 using the LAN interface 419. The diagnostic parent server 2201 stores received average values.

The sheet arrival times T, the average value calculated from the sheet arrival times T, and diagnostics results using the sheet arrival times T are each provided with identification information indicating correspondence between values. When analyzing average values received from the image forming device 100, the diagnostic parent server 2201 references the identification information of diagnostic results received from the diagnostic server 101 to take into consideration diagnostic results corresponding to the average values. Analysis results from the diagnostic parent server 2201 are fed back to the failure diagnostics and life prediction algorithms of the diagnostic server 101 and used to improve diagnostic accuracy.

The diagnostic server 101, for example, performs a failure diagnostics and a life prediction once a week at midnight, and transmits the results to the diagnostic parent server 2201. FIG. 22A illustrates a life prediction result as a diagnostics result transmitted from the diagnostic server 101 to the diagnostic parent server 2201. When receiving the diagnostic result from the diagnostic server 101, the diagnostic parent server 2201 sequentially stores and analyzes the diagnostic result. FIG. 22B illustrates data stored by the diagnostic parent server 2201.

As illustrated in FIG. 22B, the diagnostic parent server 2201 sequentially stores average values of sheet arrival times T received from the image forming device 100 and diagnostic results received from the diagnostic server 101. In this case, the average values and the diagnostic results are transmitted to the diagnostic parent server 2201 associated with IDs for clarifying correspondence, a sheet count that is the number of times the sheet arrival time T is calculated, and an image forming device Internet Protocol (IP) address. The diagnostic parent server 2201 also stores the average values and the diagnostic results associated with this information.

[6] EMBODIMENT 6

According to Embodiment 6, the image forming device 100 transmits a maximum value of the sheet arrival times T to the diagnostic server 101.

FIG. 23 is a flowchart describing operations of the mechanism controller 200 pertaining to Embodiment 6, and illustrates processing when "YES" is true for step S709 in FIG. 7.

As illustrated in FIG. 23, the mechanism controller 200 calculates the sheet arrival time T (S2301), compares the sheet arrival time T to a maximum value Tmax of sheet arrival times, and if the sheet arrival time T is larger (S2302: "YES"), the sheet arrival time T becomes the maximum value Tmax (S2303).

If the sheet arrival time T is less than or equal to the maximum value Tmax (S2302: "NO"), then after the processing of step S2303, if the calculation of the sheet arrival time T is the tenth such calculation since the maximum value Tmax was last transmitted to the diagnostic server 101 (S2304: "YES"), the maximum value Tmax is transmitted to the diagnostic server 101 (S2305), and the value of the maximum value Tmax is initialized to 0 (S2306).

If the calculation of the sheet arrival time T is not the tenth such calculation since the maximum value Tmax was last transmitted to the diagnostic server 101 (S2304: "NO"), then after the processing of step S2306, processing proceeds to step S701 and processing is repeated.

In the example of FIG. 24A, the sheet arrival time T for 10 sheets has been calculated, and the maximum value Tmax is 262 milliseconds. Thus, after confirming the sheet arrival time T of the tenth sheet, the mechanism controller 200 transmits the maximum value Tmax of 262 milliseconds to the diagnostic server 101. As illustrated in FIG. 24B, format information indicating that the value transmitted is the maximum value for 10 calculations of the sheet arrival time T may be added.

By doing so, the diagnostic server 101 can be made to distinguish between transmission of the sheet arrival time T of all sheets and transmission of only the maximum value Tmax, for failure diagnostics and life prediction. As illustrated in FIG. 24C, the diagnostic server 101 stores maximum values received from the mechanism controller 200 for use in failure diagnostics and life prediction.

In this way, the diagnostic server 101 can be notified of an occurrence of unexpected data by transmitting the data as is, more responsively than the mechanism controller 200 transmitting an average value to the diagnostic server 101 via the primary controller 201. Further, the maximum value is obtained for every 10 sheets, and therefore it is possible to minimize a time lag from an occurrence of unexpected data to transmission of the maximum value to the diagnostic server 101.

A minimum value may be used instead of a maximum value, or both a minimum value and a maximum value may be transmitted from the mechanism controller 200 to the diagnostic server 101 via the primary controller 201. In each case, as with transmission of a maximum value, a data amount of the diagnostic data can be compressed.

For example, if transmitting only a minimum value, as illustrated in FIG. 25A, first, the sheet arrival time T is calculated for each of ten sheets used consecutively for image forming, and a minimum value determined. In the example of FIG. 25A, the minimum value is 260 milliseconds.

When transmitting the minimum value from the mechanism controller 200 to the diagnostic server 101 via the primary controller 201, a value 1 is added as format information in addition to the minimum value of 260 milliseconds, as illustrated in FIG. 25B. The format information takes a value of 1 when transmitting the minimum value of the sheet arrival time T for every 10 sheets, and takes a value of 0 when transmitting the sheet arrival time T for each sheet. In this way, the diagnostic server 101 can perform failure diagnostics and life prediction appropriate to the format of the diagnostic data.

[7] MODIFICATIONS

Although the present disclosure describes various embodiments, the present invention is of course not limited to the embodiments described above, and includes the following modifications.

(7-1) According to one or more embodiments, primarily the sheet arrival time T is used as the diagnostic data, but the present invention is of course not limited to this, and the following examples of data may be used instead or in addition to such diagnostic data.

For example, photoconductor current values may be used as diagnostic data. Photoconductor current is electric current flowing from the photosensitive drum 331 to an earth when potential of the charged photosensitive drum 331 is attenuated by exposure to light. When a film thickness d of the photosensitive drum 331 becomes smaller, an electrostatic capacity C of the photosensitive drum 331 becomes correspondingly larger, and therefore the photoconductor current becomes larger.

Focusing on this point, if the mechanism controller 200 measures photoconductor current using a photoconductor current monitor and sends information indicating the photoconductor current to the diagnostic server 101, the diagnostic server 101 can estimate film thickness of the photoconductor, and therefore life of the photosensitive drum 331 can be predicted. When measuring photoconductor current, photoconductor current may be measured at a plurality of positions (for example, 10 points) on the circumferential surface of the photosensitive drum 331, and all measured values may be transmitted to the diagnostic server 101.

Further, a drive current value of the fixing motor 326 may be used as diagnostic data. When the surface of the fixing roller 312 deteriorates, torque required for driving rotation of the fixing roller 312 increases, and therefore the drive current value of the fixing motor 326 increases. Thus, the mechanism controller 200 may transmit a drive current value of the fixing motor 326 to the diagnostic server 101, and the diagnostic server 101 may perform failure diagnostics and life prediction for the fixing roller 312.

Drive current value of the fixing motor 326 changes when a sheet passes through and when temperature of the fixing motor 312 changes, and therefore measurement may be performed 10 times under defined conditions (a measurement mode), and to transmit all 10 measurements to the diagnostic server 101.

Further, the mechanism controller 200, when performing image stabilizing processing or the like, may form a defined toner patch on the intermediate transfer belt 310 and, using an image density control (IDC) sensor, measure density of the toner patch at 10 points, for example, and transmit all 10 measurements to the diagnostic server 101. The diagnostic server 101 can perform failure diagnostics and life prediction of the intermediate transfer belt 310, the primary transfer roller 504, the photosensitive drum 331, and the like, by referring to the diagnostic data.

Further, the mechanism controller 200 may use a transfer voltage monitor to measure secondary transfer voltage under defined measurement conditions, at 10 points, for example, and transmit voltage values for all 10 points to the diagnostic server 101. By referencing the secondary transfer voltage, the diagnostic server 101 can perform failure diagnostics and life prediction for the secondary transfer roller 307 and the intermediate transfer belt 310.

(7-2) Although not specifically mentioned above, the diagnostic server 101 and the diagnostic parent server may be a computer, and may be a cloud server. In any case, the application of the disclosure can obtain the described effects.

(7-3) According to one or more embodiments, the image forming device 100 is a tandem-type color MFP, but of course the present invention is not limited to this example. The image forming device may be a color MFP other than a tandem-type device, and may be a monochrome MFP. Further, the effects of one or more embodiments are obtained when applied to a single-function device such a printer, copy machine, or facsimile device.

(7-4) According to one or more embodiments, the primary controller 201 transmits diagnostic data to the diagnostic server 101, and the diagnostic server 101 performs failure diagnostics and life prediction based on diagnostic data received, but the present invention is not limited to this example. The image forming device 100 may be provided with a diagnostic function for performing failure diagnostics and life prediction, and the image forming device 100 may perform failure diagnostics and life prediction regarding the image forming device 100. In such a case, the diagnostic data need not be transmitted to the diagnostic server 101.

[8] REVIEW

In review, one or more embodiments of the present invention are an image forming device including an image former, a primary controller, a secondary controller, one or more sensors, a first transmission path, and a second transmission path. The image former executes image forming processing to form an image on a sheet. The primary controller instructs the secondary controller to cause execution of the image forming processing. The secondary controller controls mechanical systems of the image former. Each sensor of the one or more sensors detects a state of the image former and transmits sensor data indicating the state to the secondary controller. The first transmission path between the secondary controller and the primary controller is for transmission of data related to the execution of the image forming processing. The second transmission path is different from the first transmission path. The secondary controller includes a generation unit that generates diagnostic data from the sensor data for failure diagnostics and life prediction relating to the image forming device, and a transmitter that transmits the diagnostic data to the primary controller via the second transmission path.

According to Japanese Patent Publication No. 2006-30258, two separate communication paths are provided between an image forming apparatus and a plurality of finishing apparatuses, but only one path is used at a time. Similarly, according to Japanese Patent Application Publication No. 2018-92593, two separate communication paths are provided between a main device and a control device in an information processing apparatus, but a software signal is sent through only one of the two separate communication paths. Unlike these conventional structures, the secondary controller transmits the diagnostic data to the primary controller via the second transmission path for transmitting the diagnostic data, and not the first transmission path for transmitting data related to the image forming processing, and therefore the diagnostic data can be transmitted without hindering execution of the image forming processing. As a result, the frequency of transmission of the diagnostic data to the diagnostic server can be improved, and the accuracy of failure diagnostics and life prediction by the diagnostic server can be improved.

According to one or more embodiments, the primary controller transmits the diagnostic data received from the secondary controller to a diagnostic server that performs the failure diagnostics and life prediction.

According to one or more embodiments, the image forming device further includes a load determiner that determines whether the primary controller is in a high load state, and a stop instruction unit that transmits to the secondary controller an instruction to temporarily stop transmission of the diagnostic data when a result of determining whether the primary controller is in the high load state is positive. Further, the secondary controller, upon receiving the instruction to temporarily stop transmission of the diagnostic data, stops the transmission of the diagnostic data by the transmitter until reception of an instruction to restart the transmission of the diagnostic data.

According to one or more embodiments, the image forming device further includes a judgment unit that judges whether transmission of the diagnostic data by the transmitter is required, and a prohibition unit that prohibits the transmission of the diagnostic data by the transmitter when the judgment unit judges that the transmission of the diagnostic data is not required.

According to one or more embodiments, at least two sensors are included in the one or more sensors, and the diagnostic data includes uncompressed sensor data from at least one of the sensors.

According to one or more embodiments, the image forming device further includes a compressor that compresses the sensor data, at least two sensors are included in the one or more sensors, and the diagnostic data includes compressed sensor data from at least one of the sensors.

According to one or more embodiments, the diagnostic data includes the sensor data and the compressed sensor data, and identification data for identifying which data is compressed is added to the sensor data and the compressed sensor data.

According to one or more embodiments, the image forming device further includes a receiver that receives an instruction indicating whether or not to compress the sensor data. Further, the diagnostic data includes the sensor data in a compressed state when the instruction to compress the sensor data is received by the receiver, and the diagnostic data includes the sensor data in an uncompressed state when the instruction to not compress the sensor data is received by the receiver.

According to one or more embodiments, the secondary controller further includes a compressor that compresses the sensor data, and an association unit that adds identification data to the sensor data and the compressed sensor data that indicates association between the sensor data and the compressed sensor data. Further, the diagnostic data includes both the compressed sensor data and the sensor data as is.

According to one or more embodiments, the compressor calculates as the compressed sensor data at least one of an average value, a maximum value, and a minimum value of a defined number of values of the sensor data.

According to one or more embodiments, the image former includes a sheet feed tray that stores the sheet used in the image forming and a sheet feed roller that feeds the sheet from the sheet feed tray. Further, the one or more sensors include a sheet arrival time detector that detects a sheet arrival time, which is a time taken by the sheet to be conveyed from a first position downstream in a sheet conveyance direction from the sheet feed roller to a second position downstream in the sheet conveyance direction from the first position, and the diagnostic data includes the sheet arrival time.

According to one or more embodiments, the image former includes a photoreceptor for forming a toner image by electrophotography. Further, the one or more sensors include a surface state sensor that detects a surface state of the photoreceptor, and the diagnostic data includes an output value from the surface state sensor.

According to one or more embodiments, the image former includes a rotation member used in image forming, and a drive motor that drives rotation of the rotation member. Further, the one or more sensors include a torque sensor that detects data indicating torque of the drive motor, and the diagnostic data includes the data output by the torque sensor.

According to one or more embodiments, the image former is a tandem-type printer comprising an intermediate transfer belt that conveys a toner image transferred thereon to a secondary transfer position, the one or more sensors include a toner amount sensor that detects an amount of toner carried on the intermediate transfer belt, and the diagnostic data includes the amount of toner carried.

According to one or more embodiments, the image former comprises a transfer unit that causes an electrostatic transfer of a toner image to the sheet, the one or more sensors include a voltage detector that detects a transfer voltage for the electrostatic transfer, and the diagnostic data includes the transfer voltage.

One or more embodiments of the invention are an image forming device diagnostic system including an image forming device and a diagnostic server. The image forming device includes an image former, a primary controller, a secondary controller, one or more sensors, a first transmission path, and a second transmission path. The image former executes image forming processing to form an image on a sheet. The primary controller instructs the secondary controller to cause execution of the image forming processing and the secondary controller controls mechanical systems of the image former. Each sensor detects a state of the image former and transmits sensor data indicating the state to the secondary controller. The first transmission path between the secondary controller and the primary controller for transmission of data related to the execution of the image forming processing. The second transmission path is different from the first transmission path. Further, the secondary controller includes a generation unit that generates diagnostic data from the sensor data for failure diagnostics and life prediction relating to the image forming device, and a transmitter that transmits the diagnostic data to the primary controller via the second transmission path. The diagnostic server receives the diagnostic data from the image forming device and performs the failure diagnostics and life prediction.

One or more embodiments of the invention are an image forming device diagnostic system including an image forming device, a diagnostic server, and a diagnostic master server. The image forming device includes an image former, a primary controller, a secondary controller, one or more sensors, a first transmission path, and a second transmission path. The image former executes image forming processing to form an image on a sheet. The primary controller instructs the secondary controller to cause execution of the image forming processing and the secondary controller controls mechanical systems of the image former. Each sensor detects a state of the image former and transmits sensor data indicating the state to the secondary controller. The first transmission path between the secondary controller and the primary controller for transmission of data related to the execution of the image forming processing. The second transmission path is different from the first transmission path. Further, the secondary controller includes a generation unit that generates diagnostic data from the sensor data for failure diagnostics and life prediction relating to the image forming device, and a transmitter that transmits the diagnostic data to the primary controller via the second transmission path. The diagnostic server receives the diagnostic data from the image forming device and performs the failure diagnostics and life prediction according to a diagnostic method. Further, the secondary controller includes a compressor that compresses the sensor data and a first association unit that adds identification data to the sensor data and the compressed sensor data that associates the sensor data with the compressed sensor data. The diagnostic data includes both the compressed sensor data and the sensor data as is. The primary controller further transmits the compressed sensor data to the diagnostic master server. The diagnostic server includes a diagnostic unit, a second association unit, and a results transmitter. The diagnostic unit references the sensor data and generates diagnostic results based on the sensor data. The second association unit adds to the diagnostic results the identification data previously added to the sensor data referenced by the diagnostic unit. The results transmitter transmits to the diagnostic master server the diagnostic results with the identification data attached. The diagnostic master server includes a compressed data receiver, a diagnostic results receiver, an analyzer, and an analysis results transmitter. The compressed data receiver is for receiving the compressed sensor data to which the identification data is added from the image forming device. The diagnostic results receiver is for receiving the diagnostic results to which the identification data is added from the diagnostic server. The analyzer analyzes the diagnostic results with reference to the compressed sensor data and the diagnostic results associated with each other by the identification data. The analysis results transmitter transmits to the diagnostic server the analysis results. Further, when the diagnostic server receives the analysis results from the diagnostic master server, the diagnostic server updates the diagnostic method according to the analysis results.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. An image forming device comprising:
   an image former that executes image forming processing to form an image on a sheet;
   a primary controller;

a secondary controller that controls the image former, wherein the primary controller instructs the secondary controller to execute the image forming processing;

a sensor that detects a state of at least one component of the image forming device and transmits sensor data indicating the state to the secondary controller;

a first transmission path for duplex communication between the secondary controller and the primary controller; and a second transmission path different from the first transmission path, wherein the first transmission path is a transmission line or a transmitter-receiver set, the second transmission path is a transmission line or a transmitter-receiver set, data related to the execution of the image forming processing is transmitted through the first transmission path and not the second transmission path, and the secondary controller:
  generates, from the sensor data, diagnostic data for failure diagnostics or life prediction relating to the image forming device, and
  transmits the diagnostic data to the primary controller via the second transmission path and not the first transmission path, or
  transmits the sensor data to the primary controller via the second transmission path and not the first transmission path.

2. The image forming device of claim 1, wherein the primary controller transmits the diagnostic data to a diagnostic server that performs the failure diagnostics and life prediction.

3. The image forming device of claim 1, wherein
the primary controller further:
  determines whether the primary controller is in a high load state, and
  transmits to the secondary controller an instruction to temporarily stop transmission of the diagnostic data when determining the primary controller is in the high load state, and
the secondary controller, upon receiving the instruction to temporarily stop the transmission of the diagnostic data, stops the transmission of the diagnostic data until reception of an instruction to restart the transmission of the diagnostic data.

4. The image forming device of claim 1, wherein
the primary controller further:
  judges whether transmission of the diagnostic data is required, and
  prohibits the transmission of the diagnostic data when judging that the transmission of the diagnostic data is not required.

5. The image forming device of claim 1, wherein
the sensor comprises at least two sensors, and
the diagnostic data include uncompressed sensor data obtained from at least one of the sensors.

6. The image forming device of claim 1, wherein
the secondary controller further compresses the sensor data,
the sensor comprises at least two sensors, and
the diagnostic data include compressed sensor data obtained from at least one of the sensors.

7. The image forming device of claim 6, wherein
the diagnostic data include the sensor data and the compressed sensor data, and
identification data are added to the sensor data and the compressed sensor data, the identification data identifying which data are compressed.

8. The image forming device of claim 6, wherein the secondary controller calculates as the compressed sensor data at least one of an average value, a maximum value, and a minimum value of a defined number of values of the sensor data.

9. The image forming device of claim 1, further comprising:
a receiver that receives an instruction indicating whether to compress the sensor data, wherein
the diagnostic data include compressed sensor data when the receiver receives the instruction to compress the sensor data, and
the diagnostic data include uncompressed sensor data when the receiver receives the instruction not to compress the sensor data.

10. The image forming device of claim 1, wherein
the secondary controller further:
  compresses the sensor data, and
  adds identification data to the sensor data and the compressed sensor data, the identification data indicating association between the sensor data and the compressed sensor data, and
the diagnostic data include the compressed sensor data and the sensor data.

11. The image forming device of claim 1, wherein
the image former comprises:
  a sheet feed tray that stores the sheet used in the image forming; and
  a sheet feed roller that feeds the sheet from the sheet feed tray,
the sensor includes a sheet arrival time detector that detects a sheet arrival time,
the sheet arrival time is taken by the sheet to be conveyed from a first position to a second position,
the first position is downstream in a sheet conveyance direction from the sheet feed roller and the second position is downstream in the sheet conveyance direction from the first position, and
the diagnostic data include the sheet arrival time.

12. The image forming device of claim 1, wherein
the image former comprises:
  a photoreceptor that forms a toner image by electrophotography,
the sensor comprises a surface state sensor that detects a surface state of the photoreceptor, and
the diagnostic data include an output value obtained from the surface state sensor.

13. The image forming device of claim 1, wherein
the image former comprises:
  a rotation drum used in image forming; and
  a drive motor that drives rotation of the rotation drum,
the sensor detects data indicating torque of the drive motor, and
the diagnostic data include the detected data.

14. The image forming device of claim 1, wherein
the image former is a tandem-type printer comprising an intermediate transfer belt that conveys a toner image to a secondary transfer position,
the toner image transferred on the intermediate transfer belt,
the sensor detects an amount of toner carried on the intermediate transfer belt, and
the diagnostic data include the amount of toner carried.

15. The image forming device of claim 1, wherein
the image former comprises a transfer roller that electrostatically transfers a toner image to the sheet,
the sensor detects a transfer voltage for the electrostatic transfer, and
the diagnostic data include the transfer voltage.

16. An image forming device diagnostic system comprising:
an image forming device comprising:
an image former that executes image forming processing to form an image on a sheet;
a primary controller;
a secondary controller that controls the image former, wherein the primary controller instructs the secondary controller to execute the image forming processing;
a sensor that detects a state of the image former and transmits sensor data indicating the state to the secondary controller;
a first transmission path between the secondary controller and the primary controller, wherein data related to the execution of the image forming processing is transmitted through the first transmission path; and
a second transmission path different from the first transmission path, wherein
the secondary controller:
generates, from the sensor data, the diagnostic data for failure diagnostics and life prediction relating to the image forming device, and
transmits the diagnostic data to the primary controller via the second transmission path;
the image forming device diagnostic system further comprises:
a diagnostic server that receives the diagnostic data from the image forming device and that performs the failure diagnostics and life prediction based on a way of diagnosing; and
a diagnostic master server,
the secondary controller:
compresses the sensor data, and
adds identification data to the sensor data and the compressed sensor data and associates the sensor data with the compressed sensor data,
the diagnostic data include the compressed sensor data and the sensor data,
the primary controller further transmits the compressed sensor data to the diagnostic master server,
the diagnostic server:
references the sensor data and generates a diagnostic result based on the sensor data,
adds the identification data to the diagnostic result, and
transmits the diagnostic result to the diagnostic master server, and
the diagnostic master server:
receives from the image forming device the compressed sensor data,
receives from the diagnostic server the diagnostic result,
analyzes the diagnostic result with reference to the compressed sensor data and the diagnostic result associated with each other by the identification data, and
transmits to the diagnostic server the analysis results, and
when the diagnostic server receives the analysis results from the diagnostic master server, the diagnostic server updates the way of diagnosing based on the analysis results.

17. An image forming device diagnostic system comprising:
an image former that executes image forming processing to form an image on a sheet;
a primary controller;
a secondary controller that controls the image former, wherein the primary controller instructs the secondary controller to execute the image forming processing;
a sensor that detects a state of the image former and transmits sensor data indicating the state to the secondary controller;
a first transmission path between the secondary controller and the primary controller, wherein data related to the execution of the image forming processing is transmitted through the first transmission path; and
a second transmission path different from the first transmission path, wherein
the secondary controller:
generates, from the sensor data, diagnostic data for failure diagnostics or life prediction relating to the image forming device, and transmits the diagnostic data to the primary controller via the second transmission path, or
transmits the sensor data to the primary controller via the second transmission path,
the primary controller further:
determines whether the primary controller is in a high load state, and
transmits to the secondary controller an instruction to temporarily stop transmission of the diagnostic data when determining the primary controller is in the high load state, and
the secondary controller, upon receiving the instruction to temporarily stop the transmission of the diagnostic data, stops the transmission of the diagnostic data until reception of an instruction to restart the transmission of the diagnostic data.

* * * * *